US011493978B2

(12) United States Patent
Lorch et al.

(10) Patent No.: US 11,493,978 B2
(45) Date of Patent: Nov. 8, 2022

(54) DECENTRALIZED SLEEP MANAGEMENT

(71) Applicant: Microsoft Technology Licensing, LLC, Redmond, WA (US)

(72) Inventors: Jacob R. Lorch, Bellevue, WA (US); Siddhartha Sen, New York, NY (US); Jitendra D. Padhye, Redmond, WA (US); Richard L. Hughes, Monroe, WA (US); Carlos Garcia Jurado Suarez, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 763 days.

(21) Appl. No.: 15/443,480

(22) Filed: Feb. 27, 2017

(65) Prior Publication Data
US 2017/0168545 A1 Jun. 15, 2017

Related U.S. Application Data

(63) Continuation of application No. 12/940,806, filed on Nov. 5, 2010, now Pat. No. 9,582,062.

(51) Int. Cl.
*G06F 1/3228* (2019.01)
*G06F 1/3209* (2019.01)

(52) U.S. Cl.
CPC .......... *G06F 1/3228* (2013.01); *G06F 1/3209* (2013.01)

(58) Field of Classification Search
CPC .... G06F 1/3209; G06F 1/3228; G06F 1/3206; G06F 1/3203; H04W 52/00;
(Continued)

(56) References Cited

U.S. PATENT DOCUMENTS 5,915,119 A * 6/1999 Cone ....................... H04L 12/12
713/310
6,941,350 B1 * 9/2005 Frazier .............. G06F 15/17375
709/209
(Continued)

FOREIGN PATENT DOCUMENTS

WO  WO2010009164 A2  1/2010

OTHER PUBLICATIONS

Wikipedia, entry for Heartbeat, Dec. 24, 2016, (web.archive.org/web/20161224184727/https://en.wikipedia.org/wiki/Heartbeat_(computing)), whole document (Year: 2016).*
(Continued)

*Primary Examiner* — Michael Thier
*Assistant Examiner* — Jose L Perez
(74) *Attorney, Agent, or Firm* — Faegre Drinker Biddle & Reath LLP

(57) ABSTRACT

Techniques for employing a decentralized sleep management service are described herein. In some instances, each computing device of a group of computing devices periodically shares information about itself with each other computing device of the group. With this information, each computing device within the group that is awake and capable of managing other devices selects a subset of devices to probe. The devices then probe this subset to determine whether the probed devices are asleep. In response to identifying a sleeping device, the probing device takes over management of the sleeping device. Managing the sleeping device involves informing other devices of the group that the sleeping device is being managed, in addition to monitoring requests for services on the sleeping device. In response to receiving a valid request for a service hosted by the sleeping device, the managing device awakens the
(Continued)

sleeping device and ceases managing the now-woken device.

20 Claims, 16 Drawing Sheets

(58) Field of Classification Search
CPC ............ H04W 52/02; H04W 52/0212; H04W 52/0219; H04W 52/0225; H04W 52/0229; H04W 52/0251; H04L 12/12; H04L 41/00; H04L 41/34; H04L 43/00; H04L 43/02; H04L 43/10; H04L 43/12
See application file for complete search history.

(56) References Cited

U.S. PATENT DOCUMENTS

| | | | |
|---|---|---|---|
| 7,107,318 B2 | 9/2006 | Brown et al. | |
| 7,349,355 B2 | 3/2008 | Sengupta et al. | |
| 7,409,432 B1 | 8/2008 | Recio et al. | |
| 7,701,858 B2 | 4/2010 | Werb et al. | |
| 7,742,426 B2 | 6/2010 | Schumacher et al. | |
| 7,783,786 B1 | 8/2010 | Lauterbach | |
| 7,788,522 B1 | 8/2010 | Abdelaziz et al. | |
| 2002/0062454 A1* | 5/2002 | Fung | G06F 3/0634 713/300 |
| 2004/0043797 A1* | 3/2004 | Shostak | H04W 52/0216 455/574 |
| 2004/0107273 A1* | 6/2004 | Biran | H04L 67/1002 709/223 |
| 2005/0060590 A1* | 3/2005 | Bradley | G06F 1/3203 713/320 |
| 2006/0112287 A1 | 5/2006 | Paljug | |
| 2007/0005744 A1 | 1/2007 | Rothman et al. | |
| 2007/0005994 A1* | 1/2007 | Bahali | G06F 1/3203 713/300 |
| 2007/0067445 A1* | 3/2007 | Vugenfirer | H04L 67/141 709/224 |
| 2007/0073709 A1* | 3/2007 | Lim | G06F 1/3203 |
| 2007/0124684 A1* | 5/2007 | Riel | G06F 9/5088 715/736 |
| 2008/0069104 A1* | 3/2008 | von Eicken | H04L 45/04 370/392 |
| 2008/0080457 A1* | 4/2008 | Cole | H04W 76/10 370/342 |
| 2008/0098241 A1 | 4/2008 | Cheshire | |
| 2009/0083560 A1* | 3/2009 | O'Connell | G06F 1/3209 713/323 |
| 2009/0106571 A1* | 4/2009 | Low | G06F 9/4856 713/310 |
| 2009/0135751 A1* | 5/2009 | Hodges | G06F 1/3293 370/311 |
| 2009/0172443 A1* | 7/2009 | Rothman | G06F 1/3209 713/323 |
| 2010/0115509 A1* | 5/2010 | Kern | G06F 1/3203 718/1 |
| 2010/0191994 A1 | 7/2010 | Nurminen et al. | |
| 2010/0235003 A1* | 9/2010 | Maly | G06F 1/206 700/276 |
| 2010/0235668 A1* | 9/2010 | Cheshire | G06F 1/3209 713/323 |
| 2010/0299401 A1* | 11/2010 | Lloyd | G06F 15/16 709/209 |
| 2011/0010706 A1* | 1/2011 | Lambert | G06F 11/1484 718/1 |
| 2011/0170464 A1* | 7/2011 | Sengottaiyan | H04W 52/0229 370/311 |
| 2011/0191610 A1* | 8/2011 | Agarwal | G06F 9/45533 713/310 |
| 2011/0307716 A1* | 12/2011 | Diab | H04L 12/12 713/300 |
| 2012/0117399 A1* | 5/2012 | Chan | G06F 9/5094 713/320 |

OTHER PUBLICATIONS

Agarwal, et al., "SleepServer: A Software-Only Approach for Reducing the Energy Consumption of PCs within Enterprise Environments", retrieved on Aug. 16, 2010 at <<http://www.usenix.org/events/usenix/tech/full_papers/Agarwal.pdf>>, USENIX Association, Proceedings of Annual Technical Conference, Boston, MA, Jun. 2010, pp. 1-15.

Agarwal, et al., "Somniloquy: Maintaining Network Connectivity While Your Computer Sleeps", retrieved on Aug. 16, 2010 at <<http://research.microsoft.com/pubs/70560/tr-2008-42.pdf>>, Microsoft Corporation, Microsoft Research, 2008, pp. 1-14.

Dydensborg, "Connection Oriented Sensor Networks", retrieved on Aug. 16, 2010 at <<http://citeseerx.ist.psu.edu/viewdoc/download?doi=10.1.1.122.6243&rep=rep1&type=pdf>>, University of Copenhagen, Denmark, Ph.D. Dissertation, Dec. 9, 2004, pp. 1-242.

Jimeno, et al., "A Prototype Power Management Proxy for Gnutella Peer-to-Peer File Sharing", retrieved on Aug. 16, 2010 at <<http://citeseerx.ist.psu.edu/viewdoc/download?doi=10.1.1.119.6365&rep=rep1&type=pdf>>, IEEE Computer Society, Conference on Local Computer Networks, 2007, pp. 210-212.

"Mac OS X v10.6: About Wake on Demand", retrieved on Aug. 16, 2010 at <<http://support.apple.com/kb/HT3774>>, Apple Inc., Article HT3774, Jan. 14, 2010, pp. 1-4.

Nordman, et al., Proxying: The Next Step in Reducing IT Energy Use, IEEE, Jan. 2010, pp. 91-93.

Office action for U.S. Appl. No. 12/940,806, dated Aug. 26, 2013, Lorch, et al., "Decentralized Sleep Management", 23 pages.

Office action for U.S. Appl. No. 12/940,806, dated Nov. 2, 2012, Lorch et al., "Decentralized Sleep Management", 17 pages.

Office action for U.S. Appl. No. 12/940,806, dated Mar. 13, 2015, Lorch et al., "Decentralized Sleep Management", 14 pages.

Office action for U.S. Appl. No. 12/940,806, dated Mar. 21, 2016, Lorch et al., "Decentralized Sleep Management", 15 pages.

Office action for U.S. Appl. No. 12/940,806, dated Apr. 12, 2013, Lorch et al., "Decentralized Sleep Management", 21 pages.

Office action for U.S. Appl. No. 12/940,806, dated Aug. 17, 2016, Lorch et al., "Decentralized Sleep Management", 14 pages.

Office Action for U.S. Appl. No. 12/940,806, dated Aug. 27, 2014, Jacob R. Lorch, "Decentralized Sleep Management", 30 pages.

Reich, et al., "Sleepless in Seattle No Longer", retrieved on Aug. 6, 2010 at <<http://research.microsoft.com/apps/pubs/default.aspx?id=131390>>, USENIX Technical Conference, Jun. 22, 2010, pp. 1-14.

Sen, et al., "NightGuard: Assuring High Availability Even As Machines Sleep", submitted Sep. 2010 under a Non Disclosure Agreement, Microsoft Research, 14 pages.

TC38-TG4 Proxying Support for Sleep Modes (formerly TC32-TG21), <<www.ecma-international.org/memento/TC38-TG4.htm>>.

Wikipedia, "Subset", retrieved on Aug. 19, 2014 at <<web.archive.org/web/20101008212628/http://en.wikipedia.org/wiki/Subset>>, Oct. 2010, pp. 1-2.

* cited by examiner

DECENTRALIZED SLEEP MANAGEMENT

This Application claims priority to and is a continuation of Ser. No. 12/940,806, filed 5 Nov. 2010, entitled "Decentralized Sleep Management," which is incorporated herein by reference.

BACKGROUND

When a computer is asleep, users are unable to access services running thereon. For instance, users cannot remotely log into the computer, nor can the users remotely access files served by the computer. A previous solution addresses this problem by employing a server to monitor each of multiple logical groupings of computers and to automatically wake up one of these computers whenever a user tries to access one of its services. However, this approach requires deployment and administration of a server for each of the logical groups of computers. Managing this great deal of servers makes deployment and administration of the system both difficult and expensive in terms of hardware and management costs.

SUMMARY

Techniques for employing a decentralized sleep management service are described herein. In some instances, each computing device of a group of computing devices periodically shares information about itself with each other computing device of the group. With this information, each computing device within the group that is awake and capable of managing other devices selects a subset of devices to probe. Each of the devices then probes this respective subset to determine whether the probed devices are asleep or awake. In response to identifying a computing device that is asleep, the probing device takes over management of the sleeping device. Managing the sleeping device involves informing other devices of the group that the sleeping device is being managed, in addition to monitoring requests for services hosted by the sleeping device. In response to receiving a valid request for a service hosted by the sleeping device, the managing device awakens the sleeping device and ceases the managing of the now-woken device.

These techniques are further described below in the detailed description. This summary is not intended to identify essential features of the claimed subject matter, nor is it intended for use in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

The disclosure describes techniques for implementing a decentralized sleep management system within which computing devices (or "nodes") of the system that are awake manage other, sleeping nodes in the system. In some instances, the system implements a decentralized wakeup service where the managing nodes monitor traffic (e.g., service requests) addressed to and/or intended for respective sleeping nodes. The managing nodes also awaken the sleeping nodes in response to receiving valid service requests for the sleeping nodes. By doing so, the system allows nodes to sleep—and, hence, consume less energy—while awakening the nodes when needed. Further, by configuring some or all of the nodes of the system to manage other nodes in the system, the techniques create a decentralized system that does not require deployment and administration of one or more dedicated management servers.

While the described sleep management system(s) may implement a decentralized wakeup service, the nodes of the system may manage the other nodes for any variety of other reasons. For instance, in a load balancing system, the managing nodes may awaken one or more sleeping nodes in response to a load on the system increasing to an extent that calls for more capacity. While a few examples have been given, the techniques described below may implement a decentralized sleep management system for multiple other environments.

The discussion begins with a section entitled "Example Computing Architecture," which describes one non-limiting environment that may implement the described techniques. Next, a section entitled "Example Local, Global, and Management State" illustrates and describes state that an example node of the environment of FIG. 1 may maintain and share with other nodes of the environment. A section entitled "Example Processes for Sharing State" follows, and describes ways in which the node described in the previous section may share its state with other nodes.

Next, a section entitled "Example Probing Processes" describes ways in which nodes that are awake may identify sleeping nodes, while a section entitled "Example Management Processes" describes how a node that is awake may manage a sleeping node upon identifying the sleeping node. A proceeding section, entitled "Example Processes for Ensuring System Integrity," follows and describes how one or more nodes that are awake may ensure that enough management-capable nodes remain awake at any given time to ensure the integrity of the system. Finally, a brief conclusion ends the discussion.

This brief introduction, including section titles and corresponding summaries, is provided for the reader's convenience and is not intended to limit the scope of the claims, nor the proceeding sections.

Example Computing Architecture

Figure 1:
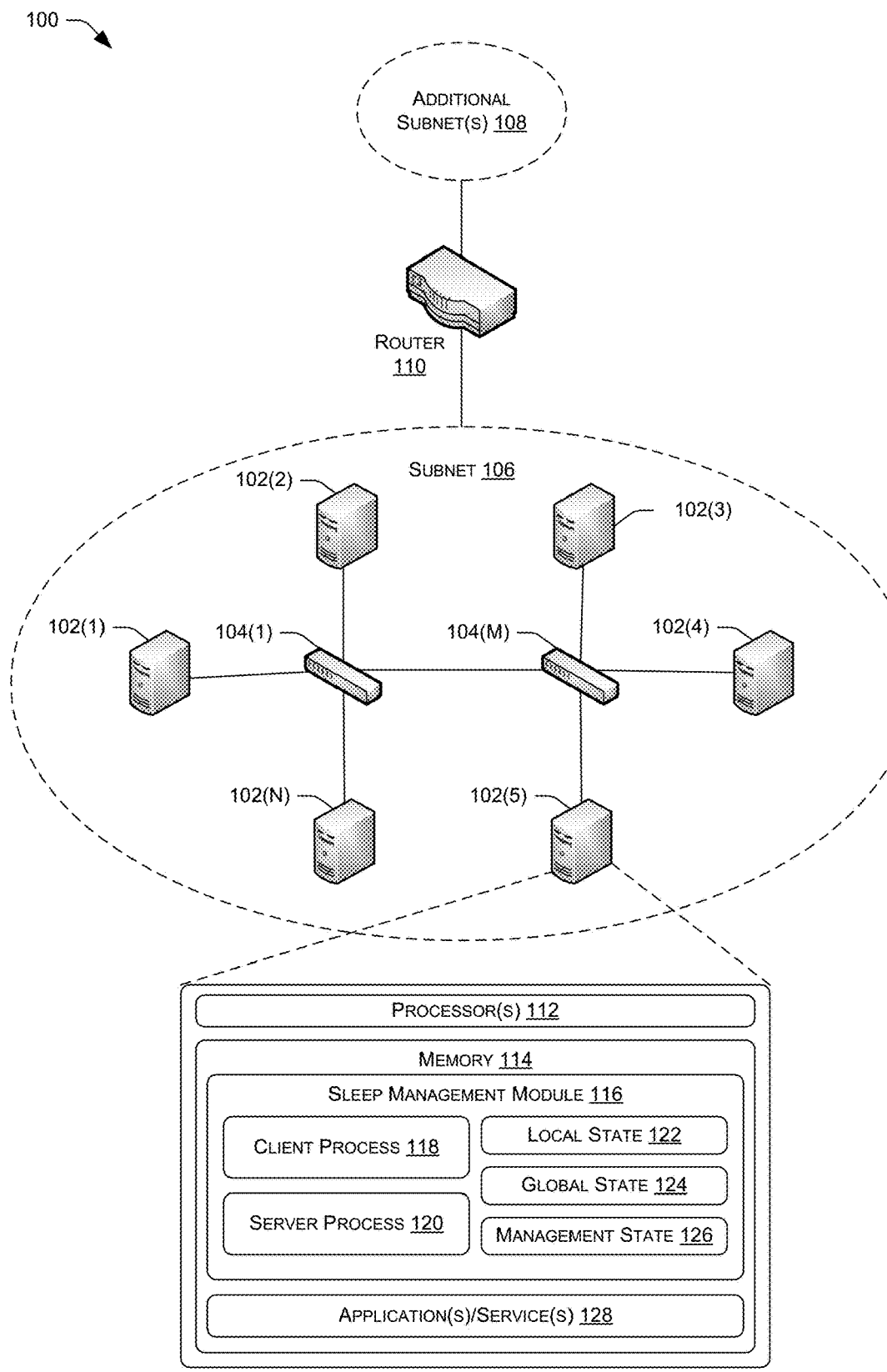
FIG. 1 illustrates an example computing architecture that includes a logical group of computing devices that collectively provide a decentralized sleep management service for managing sleeping devices within the group. In this example, the logical group of devices comprises a subnetwork (or "subnet").

FIG. 1 illustrates an example computer architecture 100 that may implement at least a portion of a decentralized sleep management system as described above. The architecture 100 includes a logical grouping of multiple nodes 102(1), 102(2), . . . , 102(N) interconnected by one or more switches 104(1), . . . , 104(M), which route traffic to individual the nodes 102(1)-(N). Here, the logical grouping of nodes 102(1)-(N) comprises a subnetwork (or "subnet") 106, although other implementations may employ the described techniques in other logical groupings. Further, while FIG. 1 illustrates the nodes 102(1)-(N) uniformly, these nodes 102(1)-(N) may comprise desktop computers, servers, laptop computers, or any other sort of suitable computing device. The computing architecture 100 also illustrates that the subnet 106 of the nodes 102(1)-(N) couples to one or more additional subnets 108 via a router 110. While FIG. 1 illustrates a single router, the subnet 106 may couple to multiple routers in other implementations.

Some or all of the nodes 102(1)-(N) within the subnet 106 may collectively operate to provide a decentralized sleep management system. That is, the nodes that are awake within the subnet 106 at a given time may manage those nodes in the subnet 106 that are asleep. The managing nodes may then awaken the sleeping nodes as needed, as described in detail below. As used herein, nodes that are said to be "sleeping" may in fact reside in a sleep state, a hibernate state, or any other state in which another node may cause the sleeping node to enter a fully-usable state, such as the S0 power state. Further, nodes of the additional subnets 108 may similarly form a portion of the decentralized sleep management system (e.g., in roles other than management roles).

FIG. 1 illustrates an example node 102(5) of the subnet 106 in greater detail. In some implementations, each of other nodes 102(1)-(N) may be similarly configured. As illustrated, the node 102(5) includes one or more processors 112 and memory 114, which stores a sleep management module 116. The memory 114 may include volatile memory (e.g., random access memory (RAM)) and/or non-volatile memory (e.g., non-volatile RAM, hard disk, etc.). The sleep management module 116, meanwhile, includes a client process 118, a server process 120, local state 122, global state 124, and management state 126. As discussed below, some of the nodes 102(1)-(N) within the subnet 106 may include both the client process 118 and the server process 120, while other nodes may include the client process 118 but not the server process 120. In addition, the illustrated node 102(5) may include one or more applications or services 128 available for use by computers within and outside of the subnet 106. The node 102(5) may host these applications and/or services 128 at respective transmission control protocol (TCP) ports in some instances.

Because the node 102(5) and the other nodes within the subnet 106 run the sleep management module 116, the node 102(5) ensures that even if it goes to sleep, it will wake up when another node tries to connect to the node 102(5). To do this, the node 102(5) keeps track of the TCP ports that host the applications and/or services 128 (i.e., the ports that the node 102(5) has open) as a part of its local state 122 and broadcasts this local state 122 to the other nodes within the subnet 106. When another node on the subnet discovers that the node 102(5) has gone to sleep, the other node will begin to "manage" the sleeping node 102(5) by watching for connection attempts on those ports. If this managing node sees a request for a service on an open port of the sleeping node 102(5), the managing node will wake the node 102(5).

To enable this decentralized management scenario, the client process 118 broadcasts the local state 122 about the node 102(5), so that the node 102(5) can be woken as appropriate. The server process 120, meanwhile, takes responsibility for managing sleeping nodes and broadcasting information about these nodes to other nodes in the subnet 106. The server process 120 may also wake these managed nodes in certain instances, as described in detail below. For instance, the server process 120 may receive the broadcast local state of other nodes within the subnet 106 and may update the global state 124 of the subnet 106 with use of these received local states. The node 102(5) may then leverage this information about the other nodes when managing one or more other nodes later on, as described in detail below. Some nodes within the subnet 106 may run the client process 118 free from the server process 120 and, hence, do not act to manage other sleeping nodes.

In some instance, each node 102(1)-(N) within the subnet 106 broadcasts its local state 122 periodically (e.g., every five seconds, five minutes, five hours, etc.) and/or whenever this local state changes. When one of these nodes goes to sleep, another node running the server process 120 takes responsibility for watching that node's incoming network traffic. In addition, that node updates its own management state 126 to indicate that it is now managing the sleeping node, and also takes responsibility for extracting the local state of this sleeping nodes from the global state 124 of the managing node and broadcasting this local state periodically (e.g., every five seconds, minutes, hours, etc.).

Because of this broadcasting policy, the sleep management module 116 ensures that each node that runs the server process 120 and that has been awake for at least a predetermined period of time (e.g., five minutes) will know the latest information about each of the nodes 102(1)-(N) on the subnet 106. A node that has been awake (e.g., in the S0 power state) for less than the example five minutes is called freshly-started, and such a node may not necessarily know up-to-date information about the entire subnet 106.

In some instances, a node of the subnet 106 is able to manage additional nodes if the node runs the server process 120 and the node is not subject to a load cap, meaning that the CPU of the node is not experiencing an undue burden based on the node running the sleep management module 116. In other instance, the node should also be able to communicate with other nodes in the network (e.g., which may include waiting for IPSec initialization) in order to be available to manage other nodes. To determine whether a node should be subject to a load cap, each node may monitor (e.g., continuously, periodically, etc.) whether the sleep management module 116 is placing undue burden on the CPU of the node. If so, the module 116 may apply a load cap that prevents the respective node from managing additional clients. The module 116 may also shed load by ceasing to manage some nodes of the subnet 106 that it is currently managing.

When a node of the subnet 106 is able to manage additional nodes of the subnet 106, this node may probe (e.g., periodically) random nodes within the subnet 106 to determine whether or not these nodes are asleep. If the probing node finds a sleeping and unmanaged node, this probing node may take over responsibility for managing that node. To do so, the node notifies the switches 104(1)-(M) to redirect traffic addressed to the MAC address of the managed node to the port on the switch of the managing node. This way, the server process 120 of the sleep management module 116 can watch for connection attempts to open TCP ports and respond by waking the managed node when the connection attempts specify an open port of the managed node.

The server process 120 may also function to ensure that at least a predetermined threshold of management-capable nodes remain awake at any given time. The prospect of falling below this threshold may be highly problematic, as this increases the probability that all machines will enter a sleep state a same time, which in turn would result in remote users being unable to awaken their machines. To prevent this scenario, the techniques described in detail below use "guardians," which are respective management-capable nodes of the subnet 106 that run a process that tells the operating systems of the respective nodes to keep the node awake. In some embodiments, whenever too few management-capable nodes are awake, another node is chosen as a "recruiter," whose role is to wake up nodes and make these nodes guardians until enough management-capable nodes are awake such that the possibility of falling below the threshold of management-capable nodes that are awake is unlikely. In other embodiments, meanwhile, each node calculates its suitability to be a guardian and maintains this information in the respective node's local state. If a node ever finds that it is one of the "q" most suitable guardians (e.g., where q equals 1, 3, 5, etc.), the node automatically becomes a guardian. Suitability to be a guardian can be based on multiple different factors, such as the device type of the node (e.g., desktop computer, laptop computer, etc.), how much power the node typically consumes, and the like.

Example Local, Global, and Management State

Figure 2:
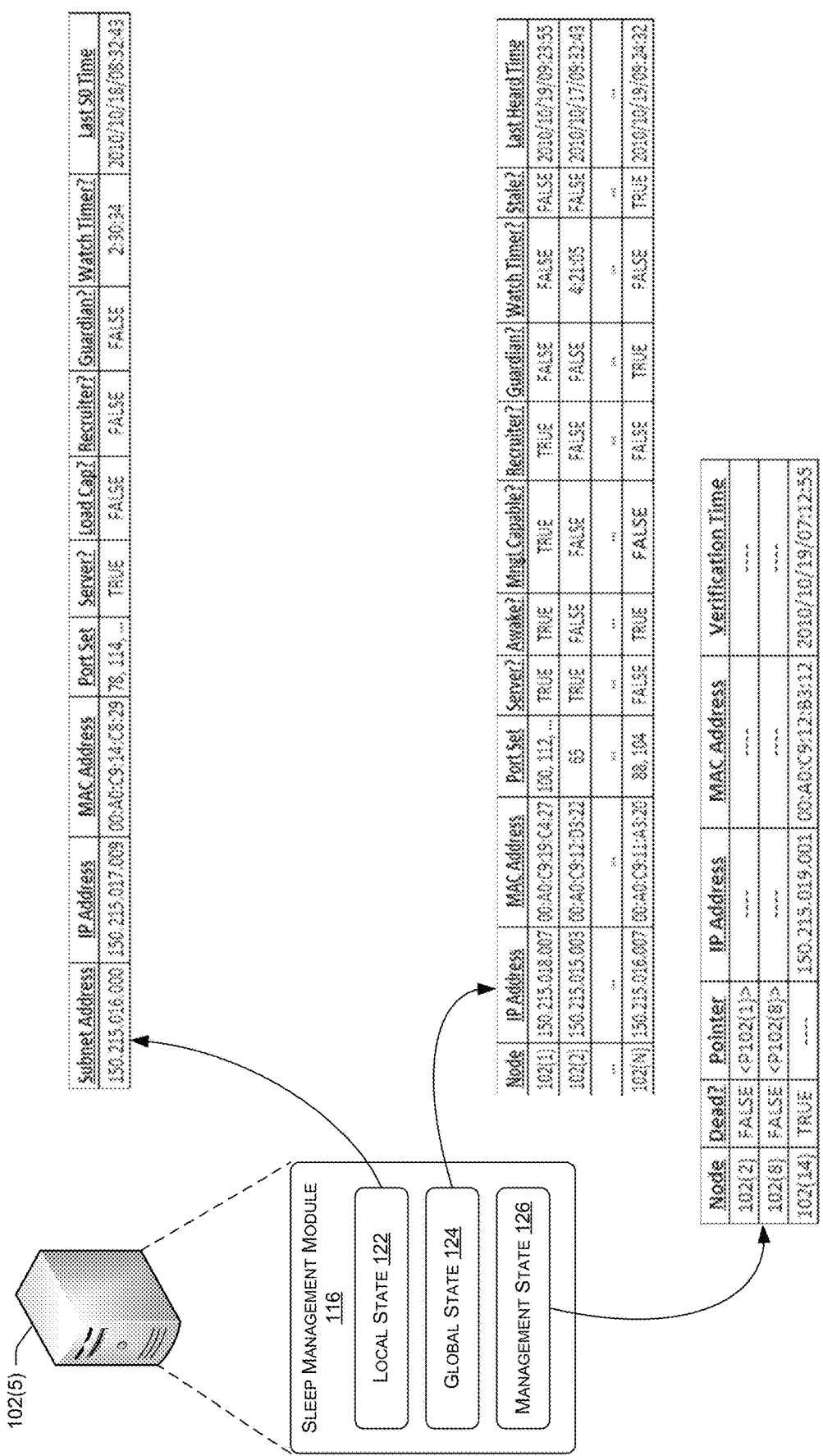
FIG. 2 illustrates an example computing device of the subnet of FIG. 1. This device stores local state of the device, global state of the subnet, and management state of the device, indicating the devices that the illustrated device currently manages.

FIG. 2 illustrates the example node 102(5) of the subnet 106 of FIG. 1, which stores the local state 122, the global state 124, and the management state 126. The local state 122 refers to state about the node 102(5), which the node 102(5) is authoritative over. The global state 124, meanwhile, refers to information about each the other nodes 102(1)-(N) in the subnet 106, and may comprise a local cache consisting of information entries learned from other nodes. The management state 126 concerns the set of nodes this node is managing. In some instances, the client process 118 maintains the local state 122, while the server process 120 maintains the global state 124 and the management state 126. Nodes that run the client process 118 but not the server process 120, meanwhile, may maintain their local states but not global and management states.

As FIG. 2 illustrates, the local state 122 may include one or more of:
- An identification of the subnet 106 of the node 102(5);
- The Internet protocol (IP) address of the node 102(5);
- The MAC address of the node 102(5);
- The port set of the node 102(5) (i.e., the set of TCP ports it has open or has had open within a predetermined amount of time (e.g., within the last week));
- Whether the node 102(5) has the server process 120 installed;
- Whether the node 102(5) is subject to a load cap;
- Whether the node 102(5) is a recruiter (in embodiments that utilize recruiters);
- Whether the node 102(5) is a guardian or, in some embodiments, whether the node 102(5) can be a guardian;
- Whether the node 102(5) has wake-on-timer ability; and
- The last time that the node 102(5) woke up from a sleeping state (e.g., entered the S0 power state).

The node 102(5) keeps this information as up to date as possible. For instance, when a node such as the node 102(5) enters the S0 power state, it updates the "last time it entered the S0 power state" time to the current time. The node 102(5) also must register to learn whenever its subnet or IP address changes. In some instances, the local state 122 is volatile. That is, the node 102(5) may store this state in volatile memory and may recreate this state when the node 102(5) starts up. Since some fields of the local state may infrequently or never change, such as whether the node 102(5) includes the server process 120, some implementations may store the values of these fields on disk to avoid re-computing them each time the node 102(5) starts up.

The global state 124, meanwhile, may describe the illustrated node's view of other nodes within the subnet 106. For each of these other nodes that the node 102(5) has information about, the global state 124 may comprise an entry consisting of one of more pieces of the following information as illustrated:
- The other node's IP address;
- The other node's MAC address;
- The other node's port set;
- Whether the other node has the server process 120 enabled;
- Whether the other node is awake;
- Whether the other node can manage further nodes;
- Whether the other node is a recruiter (in embodiments that utilize recruiters);
- Whether the other node is a guardian or, in some embodiments, whether the node 102(5) can be a guardian;
- Whether the other node has wake-on-timer ability;
- Whether the above information is stale (i.e., not updated since the last time the node 102(5) entered the S0 state);
- The last-heard time (i.e., the latest last-heard time appearing in a heartbeat sent directly from the node that any node in the subnet has heard (also represents the time when all of the above fields that came from the heartbeat were generated, except the awake field)); and
- When the node 102(5) last heard a sleep notification from the other node (not illustrated).

The node 102(5) may store the global state 124 on disk so that the state survives a reboot. However, whenever the subnet 106 changes, the node 102(5) may clear the global state 124, as the state 124 may no longer be relevant in the new subnet. For this reason, the global state 124 may also include the subnet to which the global state refers. Further, the node 102(5) may check how old the global state 124 is upon awakening in some instances. Here, when the global state 124 is older than a preset threshold (e.g., one hour, one day, one month, etc.), the node 102(5) may clear this state 124. Further, in some scenarios, freshly-started nodes may ignore stale entries since they reflect information that could be very out of date.

Finally, the management state 126 may include a list of nodes of the subnet 106 that the node 102(5) currently manages. In some embodiments, this state 126 also contains, for each such managed node, a bit indicating whether or not the node is dead, (i.e., known to no longer be present and wake-able on the subnet 106). For each non-dead node, the management state 126 includes a pointer to the corresponding entry in the global state 124. For each dead node, the management state 126 may include one or more of:

- The dead node's IP address;
- The dead node's MAC address; and
- When the dead node was verified by the node 102(5) to be dead.

In some instances, the management state 126 is volatile. That is, whenever the node 102(5) awakens (e.g., enters the S0 state), the node 102(5) may clear the management state 126. The reason for this is that while the node 102(5) was asleep or off, different nodes likely started managing all of the nodes that the node 102(5) previously managed.

In other embodiments, meanwhile, the nodes do not store bits indicating whether respective nodes are dead. Instead, the techniques may implement a roll call, where each managing node periodically attempts to wake up each node that it manages during a common window of time. For instance, each managing node may attempt to awaken each node that it manages at a particular time each day that is known to each node in the system. Those managed nodes that wake up may stay awake for a predetermined and relatively short amount of time (e.g., 10 minutes), during which time the managed nodes send a direct heartbeat.

Those nodes that do not send a direct heartbeat within the common window of time, meanwhile, may be removed from the global states of the other nodes in the system. This may ensure that nodes that leave the system or are otherwise unresponsive are purged from the global state of each participating node in the system. In some instances, however, a managing node may incidentally send a stale indirect heartbeat regarding a node that has been purged from the system for failing to respond during the afore-mentioned roll call. Here, the nodes that receive this indirect heartbeat should ignore the heartbeat if the associated timestamp represents a time prior to the time of the roll call. By doing so, the techniques prevent the global states from tracking a node that has in fact left the system or is otherwise "dead."

Example Processes for Sharing State

Each of the nodes 102(1)-(N) within the subnet 106 may broadcast information, such as the node's local state 122, to each other node within the subnet via a "heartbeat" message. A heartbeat message may include one or more of the following pieces of information about the node.

- The node's IP address;
- The node's MAC address;
- The node's port set;
- Whether the node has the server enabled;
- Whether the node is awake;
- Whether the node can manage further clients;
- Whether the node has wake-on-timer ability;
- Whether the node is a recruiter;
- Whether the node is a guardian; and
- The node's last-heard time.

A node, such as the node 102(5), can send a heartbeat message about itself, or about a node that the node 102(5) manages. The former is called a direct heartbeat, and the latter is called an indirect heartbeat. The two types can be distinguished by the fact that a direct heartbeat message will have the "awake" field set to true while an indirect heartbeat message will have it set to false. Another way to distinguish them is that the source IP address will match the IP address in the payload if the heartbeat is direct.

Figure 3A:
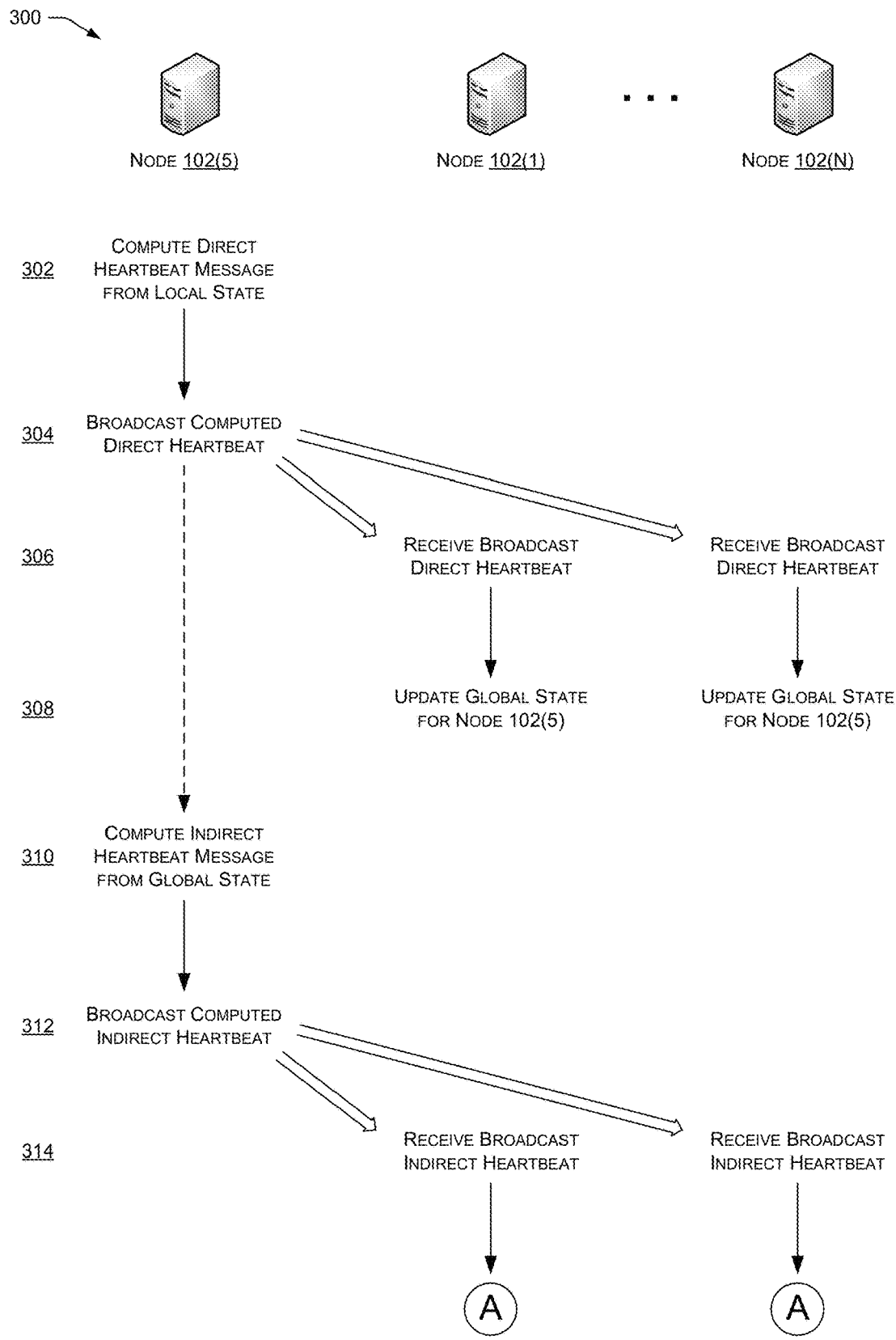
FIGS. 3A-3C illustrate an example process of the device of FIG. 2 sharing its local state with other devices of the subnet, as well as sharing information regarding those devices that the device of FIG. 2 currently manages.
Figure 3B:
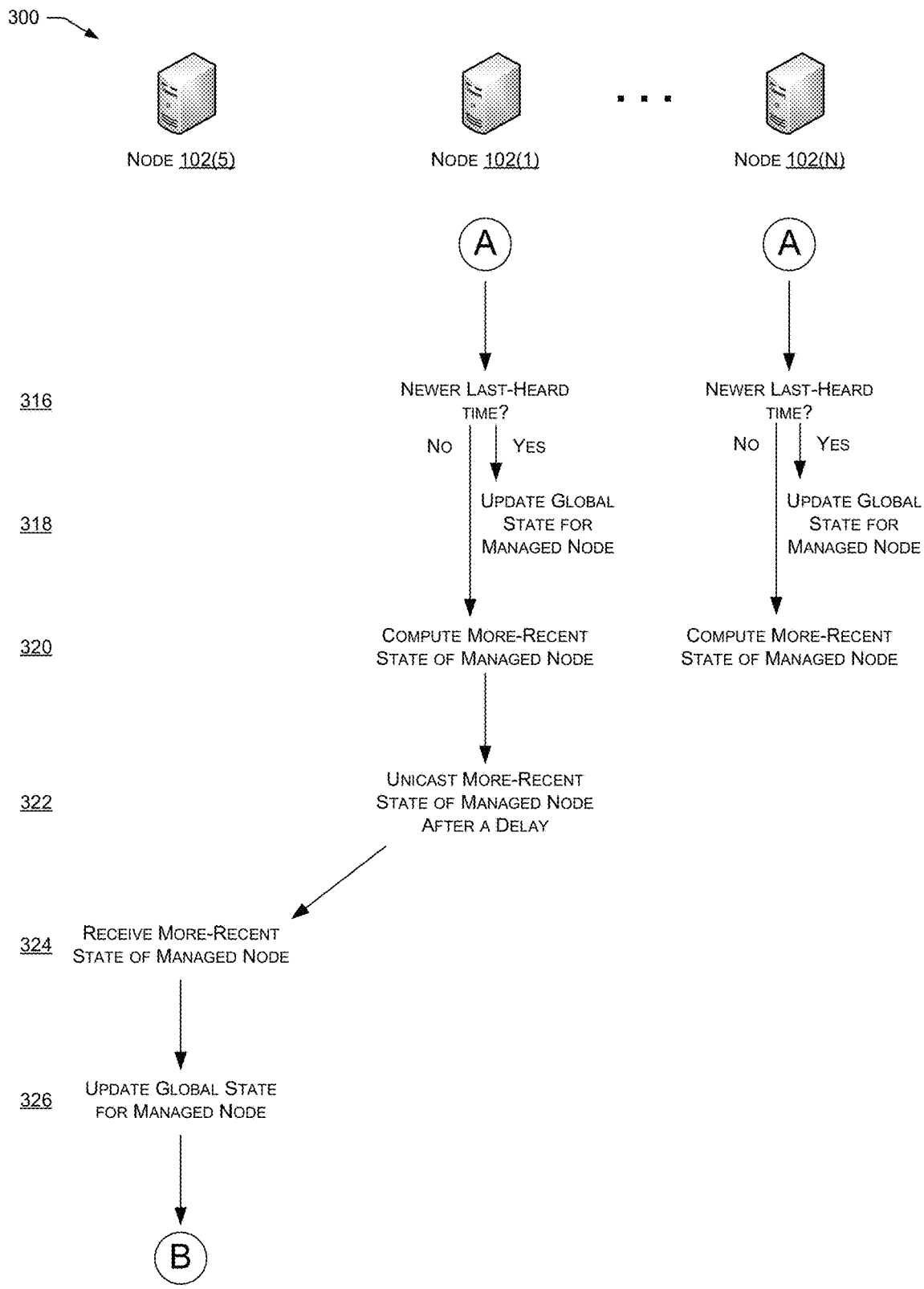
Figure 3C:
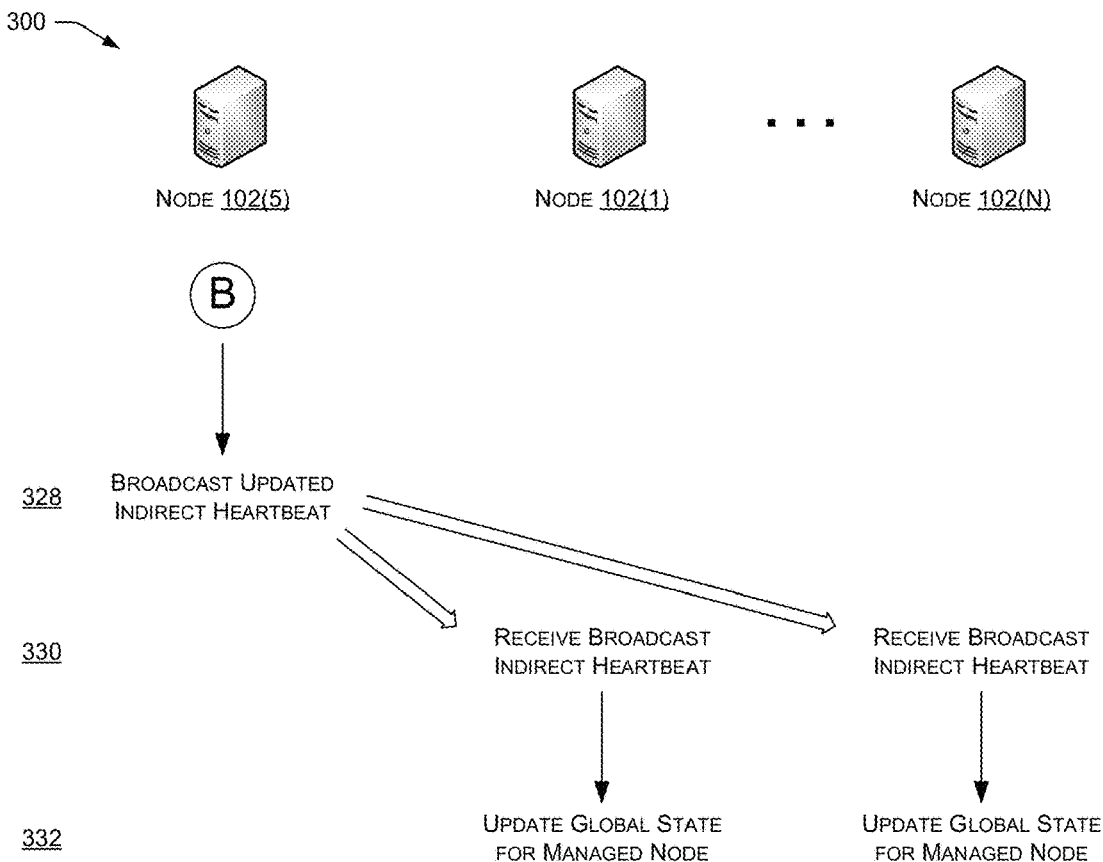

FIGS. 3A-3C illustrate an example process 300 of the node 102(5) sharing its local state 122 with the other nodes of the subnet 106 via a direct heartbeat, as well as sharing information regarding those nodes that the node 102(5) currently manages via an indirect heartbeat. The process 300, as well as each of the processes described below, is illustrated as a collection of acts in a logical flow graph, which represents a sequence of operations that can be implemented in hardware, software, or a combination thereof. In the context of software, the blocks represent computer instructions stored on one or more computer-readable storage media that, when executed by one or more processors, perform the recited operations. Note that the order in which the process is described is not intended to be construed as a limitation, and any number of the described acts can be combined in any order to implement the process, or an alternate process. Additionally, individual blocks may be deleted from the process without departing from the spirit and scope of the subject matter described herein.

The process 300 includes, at 302, the node 102(5) computing a direct heartbeat message from its local state 122, except that the node 102(5) may use the current time as the last-heard time. At 304, the node 102(5) broadcasts the computed direct heartbeat to each of the other nodes 102(1)-(N) on the subnet 106.

Whenever a node such as the node 102(5) awakens (e.g., enters the S0 state), the node may send a direct heartbeat, such as the direct heartbeat broadcast at 304. Also, whenever any of the information within the local state 122 of the node changes, the node may send a new direct heartbeat with the new information. Additionally, if the node has not sent a direct heartbeat within a certain preset amount of time (e.g., five seconds, five minutes, five hours, etc.), the node may send a direct heartbeat.

At 306, each of the other nodes 102(1)-(N) running the server process 120 may receive the direct heartbeat broadcast by the node 102(5). At 308, these nodes 102(1)-(N) update their respective global states 124 for the node 102(5).

In contrast to a direct heartbeat, a node may compute an indirect heartbeat message from its global state 124, which includes a last-heard time. The last-heard time in the global state entry represents the time that a direct heartbeat was last heard from that node. The process 300, for instance, represents the node 102(5) computing, from its global state 124, an indirect heartbeat for a node that it manages at 310.

The nodes within the subnet 106, such as the node 102(5), may send these indirect heartbeats whenever one of the nodes starts managing another node. Additionally, if the managing node (e.g., node 102(5)) has not sent an indirect heartbeat about a node that it is managing within a preset amount of time (e.g., within the last five minutes), the managing node may send an indirect heartbeat for the managed node at that time.

At 312, the node 102(5) broadcasts the computed indirect heartbeat. The server processes 120 on the nodes 102(1)-(N) listen for these heartbeat messages and, at 314, the nodes 102(1)-(N) running the server process 120 receive the indirect heartbeat broadcast by the node 102(5). FIG. 3B continues the illustration of the process 300. At 316, each of the nodes 102(1)-(N) that received the indirect heartbeat determines whether the heartbeat has a newer last-heard time than the node has stored in its global state 124. If so, then the node(s) update the corresponding entry in its global state 124 at 318. For instance, the service process 120 may set the staleness bit to false, and may overwrite the fields preceding it with those in the heartbeat. However, the server process 120 may refrain from updating the awake field to true since the node associated with the indirect heartbeat is currently being managed. Finally, the server process 120 overwrites the last-heard time in the global state 124 with the newer time.

If, however, the server process of one or more of the nodes 102(1)-(N) determines that the broadcast indirect heartbeat has an older last-heard time than the one it already has in its global state 124, then the receiving node knows that it has more up-to-date information about the managed node than does the node's manager. To correct this problem, one or more of these nodes that have the more recent information may unicast an indirect heartbeat to the node's manager to inform the manager of the more up-to-date information. For instance, FIG. 3B illustrates that the node 102(1) may possess a more-recent state of the managed node at 320 and may unicast this more recent state to the node 102(5) at 322.

However, before sending this information, the node 102(1) may insert a random (or priority-based) delay and then check to see if the heartbeat still needs to be sent. This ensures that the nodes that have received the broadcast indirect heartbeat but that have more up-to-date information about the managed node do not overwhelm the inbound bandwidth of the managing node 102(5). At 324, the managing node 102(5) receives the more-recent state of the managed node from the node 102(5) and updates the entry for the managed node in the global state 124 of the node 102(5) at 326. Note that the node 102(5) may ignore the awake field, since the node 102(5) knows the managed node is asleep.

FIG. 3C continues the illustration of the process 300, and includes the node 102(5) rebroadcasting an indirect heartbeat for the managed node at 328. The other nodes 102(1)-(N) in the subnet 106 running the server process 120 receive the broadcast and updated indirect heartbeat at 330 and then, potentially, update the global state 124 for the managed node at 332.

In addition to the above, in some instances a node that is about to go to sleep may broadcast a sleep notification to the subnet 106. This notification includes the port set, IP address, and MAC address of the node about to go to sleep. Each receiver of this message may update its state to reflect this new information by updating the "when the local node last heard a sleep notification" field to now; updating the port set to the included set; and setting the "awake" field to false. These nodes may set the awake field to false immediately rather than waiting for an explicit verification that the node is asleep for the purpose of conservatively estimating how many nodes running the server process 120 are awake. If a node that runs server process 120 is asleep, then that node is likely not doing its job as a server and so the nodes in the subnet 106 may immediately take that into account. In some embodiments that utilize recruiters, taking this into account may trigger the recruitment of a node to serve as a guardian, as discussed below with reference to FIG. 14. In other embodiments, taking this into account may trigger the awakening of a node to serve as guardian.

In still other instance, such a sleep notification may optionally include a list of managed nodes that are not dead. Each receiver of this list may update its global state 124 to reflect this new information by updating the "when the local node last heard a sleep notification" field for each of the included nodes to now and setting the "awake" fields for each of the included nodes to false. Note that dead nodes may be purposefully "dropped" by omitting them from the list.

Finally, when a node receives a heartbeat from another node for the first time, the receiving node may unicast its own direct heartbeat to the new node after a short random delay. It may also unicast indirect heartbeats for each node that it is managing. By doing so, the nodes in the subnet help new nodes update their global state 124 as soon as possible. The point of the random delay, meanwhile, is to avoid everyone sending this information at once and overwhelming the inbound bandwidth capacity of the node that sent the original heartbeat. The random delay may be calculated as described in proceeding sections.

Example Probing Processes

Each node within the subnet 106 that runs the server process 120 and that is not subject to a load cap (i.e., that is capable of managing other nodes) may periodically probe random nodes to determine whether these probed nodes need to be managed. In some instances, a freshly-started node may have stale data about some nodes, and thus might probe nodes that it has non-stale data for while refraining from probing other nodes. For example, a stale entry could include a very out-of-date port set, and it may be unwise for a node to manage another node having an unknown port set.

Figure 4:
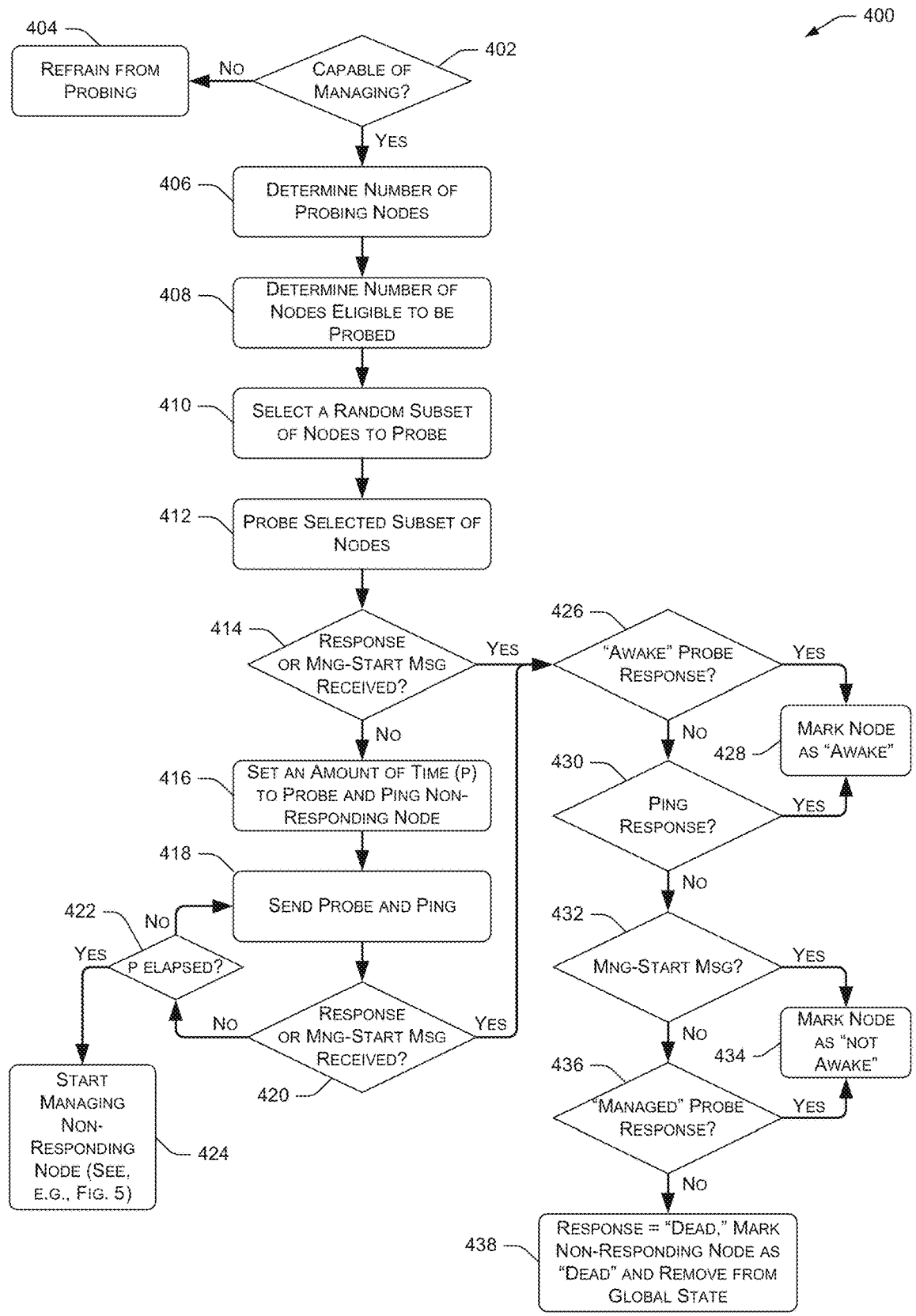
FIG. 4 is a flow diagram of an example process for probing computing devices of the subnet and determining, based at least in part on the probing, whether to begin managing one or more of the probed devices.

FIG. 4 is a flow diagram of an example process 400 for probing nodes of the subnet 106 and determining, based on the probing, whether to begin managing one or more of the probed nodes. At 402, a node determines whether it is capable of managing further clients. If the node is unable to do so (e.g., because the node doesn't run the server process 120 or is subject to a load cap), then the node will refrain from probing other nodes on the subnet 106, as shown at 404. If, however, the node is able to manage further nodes, then at 406 the node determines the number of nodes, K, that are actively probing, out of the total nodes, N, on the subnet 106 that run the sleep management module 116 including at least the client process 118. The node may determine K by counting the number of nodes in its global state 124 for which it has non-stale data and which have the "awake" and "can manage further clients" bits both set. The node may include itself in this count.

At 408, the node may then determine the set of nodes, S, within the subnet 106 that are eligible for probing. This may exclude, in some instances, itself and any nodes that this node currently manages. This set may also exclude nodes that this node has stale information for, if this node is freshly-started. Next, at 410 the node may choose a random subset of nodes to probe. While the node may select any number of nodes in this subset, in some instances the node may select a number of nodes equal to $|S||n N/(|K|-1)$. At 412, the node then sends probes to the selected subset of nodes. Further, the node may periodically repeat the acts 408, 410, and 412 (e.g., every 1 second, 3 seconds, etc.). In this way, each node may expect to receive a probe once every period with high probability. In some instances, when a node receives a probe, the node may run the probe-receiving thread at an elevated priority so it can respond to the probe rapidly, even when busy.

After sending a probe to a node of the selected subset, the process 400 represents that the node that sent the probe may determine, at 414, whether it has received a response from the node within a certain amount of time. The probing node may also determine whether it has received a "management-starting message," indicating that another node of the subnet 106 has begun managing the probed node. If the probing node has not received a response (or a management-starting message) at 414, then at 416 the node may set an amount of time, p, to probe and ping the non-responding node (e.g., 10 seconds, 20 seconds, etc.). In some instances, the probing node may set a lower amount of time p in instances where the non-responding node recently sent a sleep notification indicating that it was about to go to sleep.

Thereafter, the node may probe and ping during the set amount of time, p (e.g., once a second for p seconds) at 418. In some instances, the node may refrain from pinging the non-responding node until a certain amount of time prior to the expiration of p (e.g., during the last five seconds of p). In some instances, the node sends both probes and pings to the non-responding node to ensure that the node does not begin managing a non-responding node that is awake but whose sleep management module 116 has crashed or is otherwise non-responsive. In those instances, the nodes may respond to the pings but not the probes. Further, the node sends probes to the non-responding node because the manager of the non-responding node may respond to probes but not pings, and the node may not desire to manage a node that another node of the subnet 106 already manages.

Figure 5:
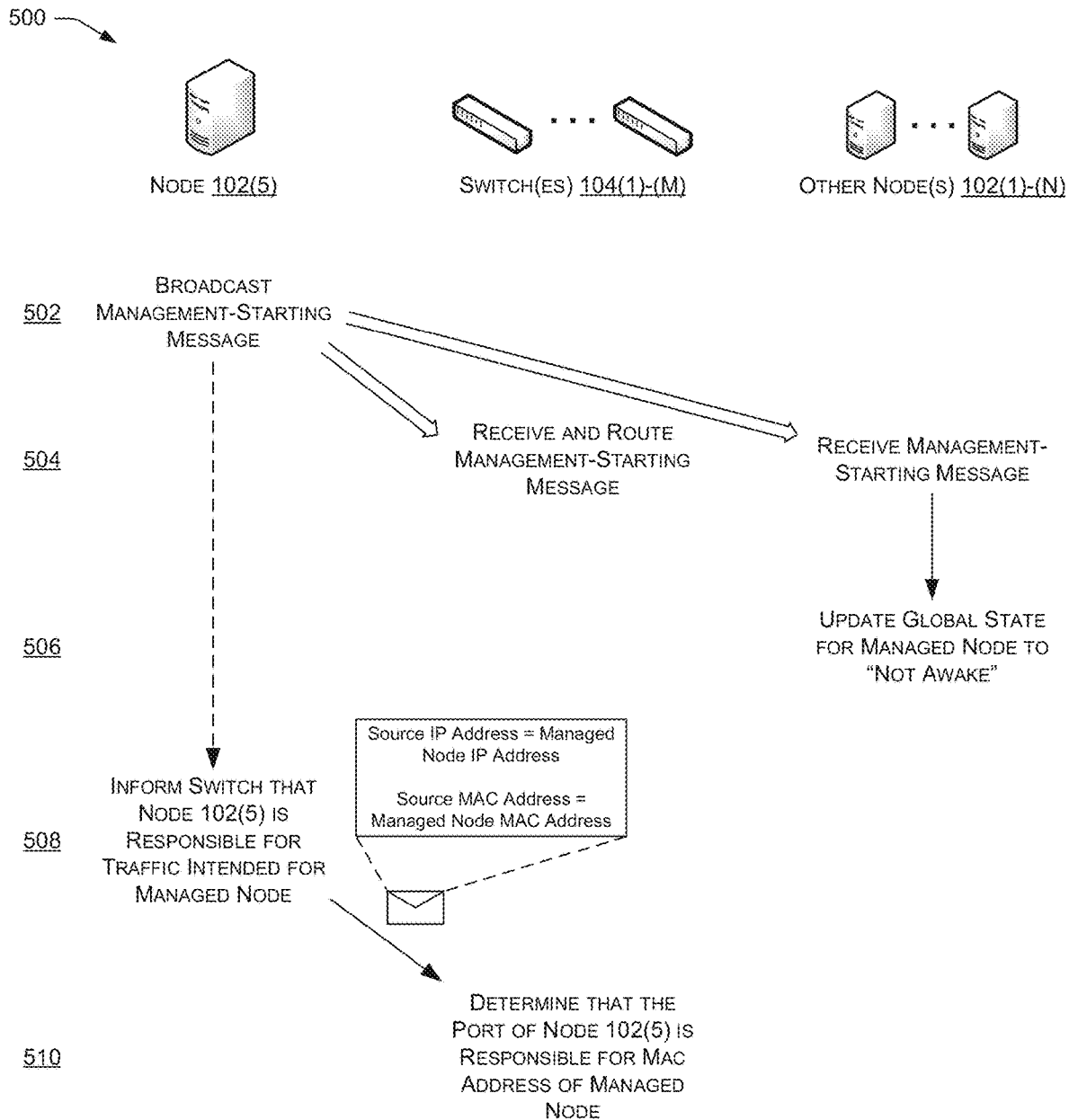
FIG. 5 illustrates an example process of the device of FIG. 2 informing other devices of the subnet that it is beginning to manage a sleeping device, as well as informing switches of the subnet that the device of FIG. 2 is now responsible for traffic intended for the sleeping device.

At 420, the node again queries as to whether it has received a response or a management-starting message. If not, then at 422 the node may determine whether the amount of time p has elapsed. If so, then the node sets the "awake" field of the non-responding node to false in the global state 124 and begins managing the non-responding node at 424. FIG. 5, described below, illustrates an example process that the probing node may employ to begin managing the non-responding node. If the amount of time p has not elapsed, meanwhile, then the node continues to send the probes and pings to the non-responding node until expiration of the amount of time p or until a response or management-starting message has been received.

If the node receives a response or a management-starting message (i.e., the yes branches of decision blocks 414 and 420), then the process 400 represents that the node may determine, at 426, whether the response was an "awake" probe response indicating that the probed node is awake. If an "awake" probe response was indeed received as determined at 426, then at 428 the probing node may mark the probed node as awake in the global state 124. If not, then the process 400 represents that the node may determine, at 430, whether the response was a ping response. If so, then the node may similarly mark the node as "awake" in the global state at 428.

If the response was neither an "awake" probe response nor a ping response, then the process 400 represents that the node may determine, at 432, whether a management-starting message was received. If so, then at 434 the probing node may mark the probed node as "not awake" in the global state. If the node did not receive a management-starting message, then the process 400 represents that the node may determine, at 436, whether the probing node received a "managed" probe response (from a manager of the probed node). If so, then the probing node marks the probed node as "not awake" in the global state 124. If not, then in some embodiments the process 400 determines that node received a "dead" probe response from another node and, hence, at 438 the probing node removes the probed node from the global state 124 of the probing node. In embodiments in which nodes do not track dead nodes, meanwhile, the process may simply end at 438 without marking the node as dead.

Example Management Processes

FIG. 5 illustrates an example process 500 that a node may implement upon beginning to manage another node of the subnet 106, such as after implementing the probing process 400 and determining to manage the non-responding node at 424. In this example process 500, the example node 102(5) may inform other nodes 102(1)-(N) of the subnet 106 that it is beginning to manage a sleeping node. In addition, the example node may inform switches of the subnet that the node 102(5) is responsible for traffic intended for the sleeping node.

At 502, the node 102(5) broadcasts a management-starting message indicating that the node 102(5) is about to start managing a non-responding node. At 504, the other nodes 102(1)-(N) of the subnet 106 running the server process 120 receive this broadcast message via the switches 104(1)-(M). In response, the other nodes 102(1)-(N) that receive the message update their global state 124 to indicate that the managed node is not awake at 506.

In addition, at 508 the node 102(5) may inform one or more of the switches 104(1)-(M) of the subnet 106 that the node 102(5) is responsible for traffic addressed to and/or intended for the sleeping and now-managed node. To do so, the node 102(5) may, for instance, send a broadcast packet with a particular payload (e.g., "manager" or the like) as if the node 102(5) were the sleeping node. That is, the node 102(5) may set the source IP address of the packet equal to the IP address of the sleeping node and may set the source MAC address equal to the MAC address of the sleeping node. At 510, the switches accordingly determine that the port on the switch of the node 102(5) is now responsible for the IP and MAC addresses of the sleeping and now-managed node.

FIGS. 6-11, meanwhile, are flow diagrams of example processes for managing a sleeping device after taking responsibility for the device, such as via the process 500 of FIG. 5.

Figure 6:
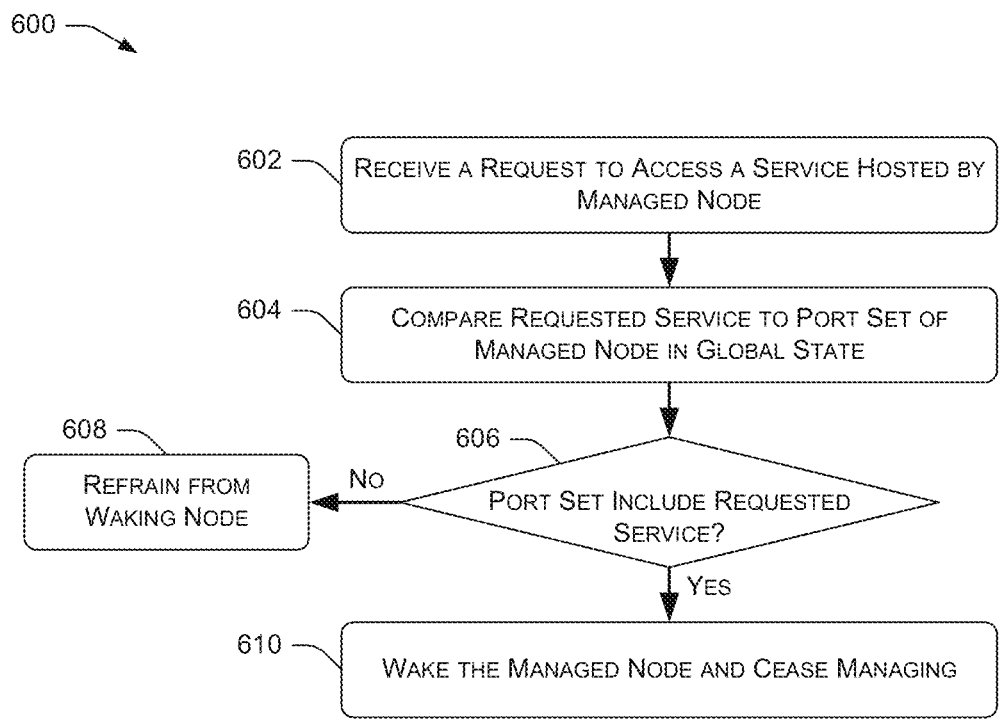
FIGS. 6-11 are flow diagrams of example processes for managing a sleeping device after taking responsibility for the device.

FIG. 6, for instance, illustrates an example process 600 that a node may employ when managing another node within the subnet 106. At 602, the managing node receives a request to access a service hosted by the managed node. For instance, the managing node may receive this request after informing the switches 104(1)-(M) of the subnet that the managing node is responsible for traffic intended for the managed node. At 604, the managing node may then compare the requested service to the port set of the managed node, as stored in the entry of the global state 124 associated with the managed node.

After doing so, at 606 the managing node determines whether the port set of the managed node includes the request service. If not, then the managing node will refrain from unnecessarily waking the managed node at 608. By doing so, the managing node saves power and resources by maintaining the managed node in the sleeping state. If, however, the port set does include the requested service, then at 610 the managing node may wake the managed node and cease the managing of the now-woken node. For instance, the managing node may awaken the previously managed node and attempt to cause this awoken node to inform the switch that the awoken node is now responsible for the traffic addressed to it, as described in detail below. As such, upon the subnet receiving a retry packet for the service hosted by the previously managed node, the switches will now direct the retry packet to the previously managed node, which may correspondingly respond to the request.

Figure 7:
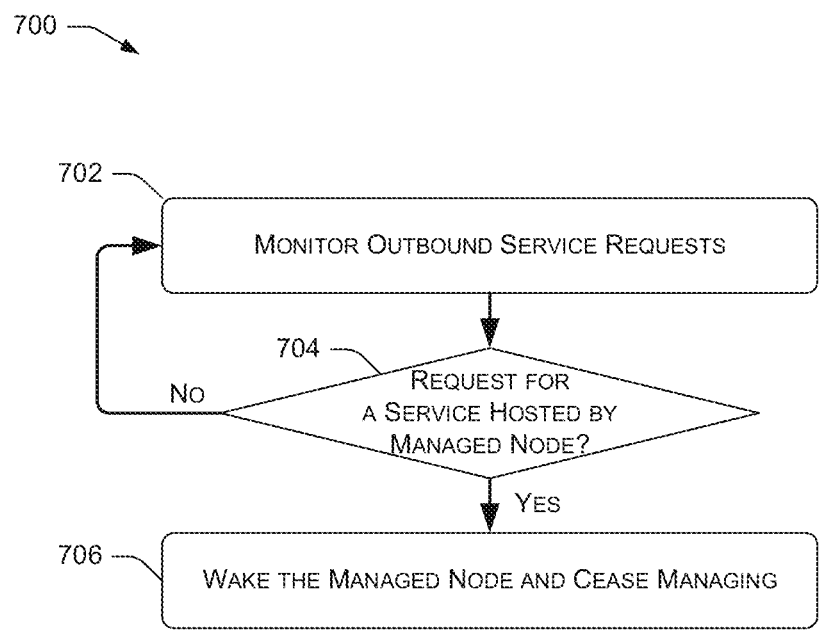

FIG. 7 illustrates another example process 700 that a node may employ when managing another node within the subnet 106. Here, the managing node may monitor, at 702, outbound service requests sent from the managing node itself. At 704, for each of these outbound service requests, the managing node may determine whether the corresponding request is for a service hosted by a node that the managing node currently manages. That is, the managing node attempts to determine whether it is currently trying to start a connection a node that it manages.

If not, then the node continues to monitor the outbound service requests at 702. However, if the outbound request is indeed for a node that the managing node currently manages, then the managing node may wake the managed node and cease management of this node at 706.

Figure 8:
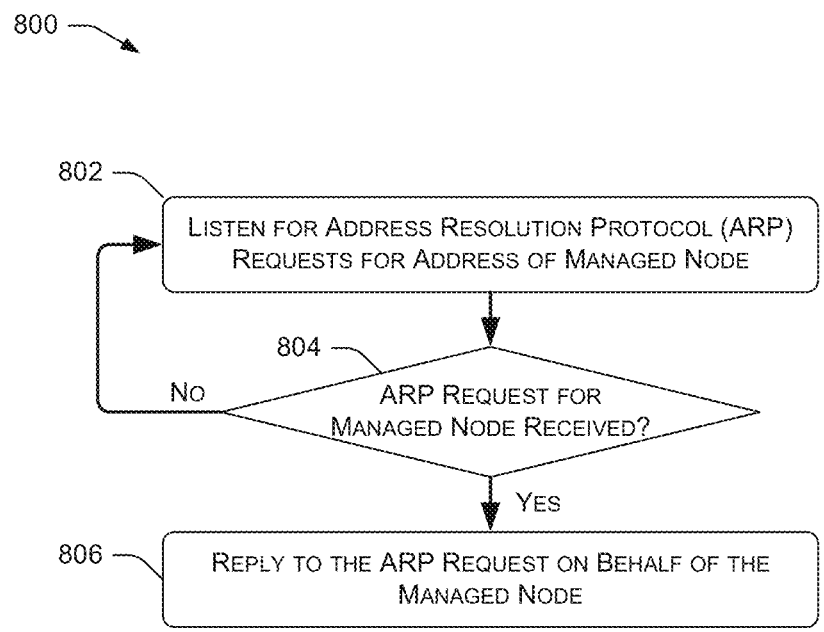

FIG. 8 illustrates yet another example process 800 that a node may employ when managing another node within the subnet 106. Here, the managing node listens, at 802, for address resolution protocol (ARP) requests for the address of the managed node. The process 800 represents that the node may determine whether such an ARP request has been received at 804. If not, then the managing node continues to listen at 802. If, however, such an ARP request is received, then at 806 the managing node responds to the ARP request with the address of the managed node, on behalf of the managed node. While FIG. 8 illustrates the managing node listening for ARP requests, it may additionally or alternatively listen for other types of requests in some instances. For instance, the node may listen for IPv6 neighbor discovery (ND) requests or any other type of request in some instances.

Figure 9:
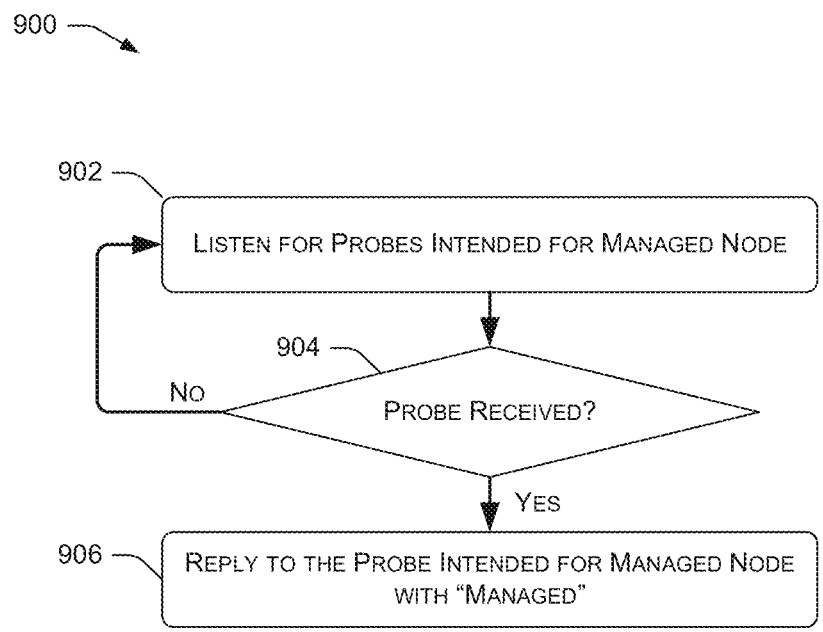

FIG. 9 illustrates yet another example process 900 that a node may employ when managing another node within the subnet 106. In this example, the managing node listens for probes intended for (e.g., addressed to) the managed node at 902. At 904, the process 900 represents the managing node determining whether it has received such a probe. If not, then the managing node may continue to listen for the probes at 902. If, however, such a probe is received, then at 906 the managing node may reply to the probe with a message of "managed," indicating that the managing node currently manages that particular node. By doing so, then managing node lessens the likelihood that other nodes will attempt to begin managing the already-managed node.

Figure 10:
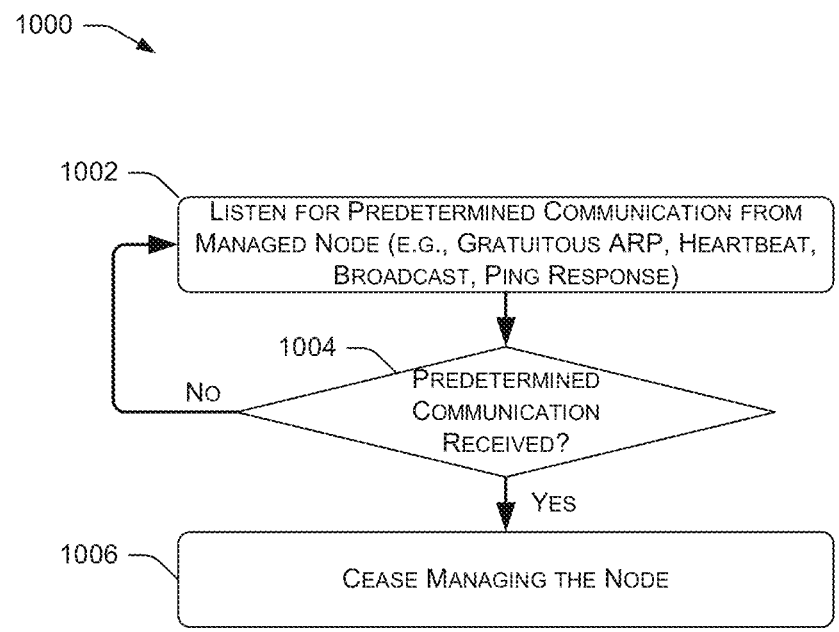

FIG. 10 illustrates yet another example process 1000 that a node may employ when managing another node within the subnet 106. Here, the managing node listens for one or more predetermined communications from the managed node itself. These communications may be a gratuitous ARP reply from the managed node, a direct heartbeat from the managed node, a ping response from the managed node, a broadcast from the managed node other than a broadcast having the payload of "manager" described at 508 of FIG. 5, or the like. At 1004, the managing node may determine whether such a communication has been received. If not, then the node continues to listen at 1002. If the node receives such a communication, meanwhile, then the managing node may cease managing at 1006.

For instance, if the managing node hears such a predetermined communication from the managed node, then the managing node may stop the managing and may send an ARP request for the IP address of the previously managed node. The sending of the ARP request may ensure that the previously managed node takes back control of its port from the previously managing node. Specifically, when the previously managed node sends its ARP response, the switches 104(1)-(M) may learn that the previously-managing node is no longer responsible for the traffic of the previously managed node. As such, this node will take back the port if for some reason the previously managing node still controlled the port.

Figure 11:
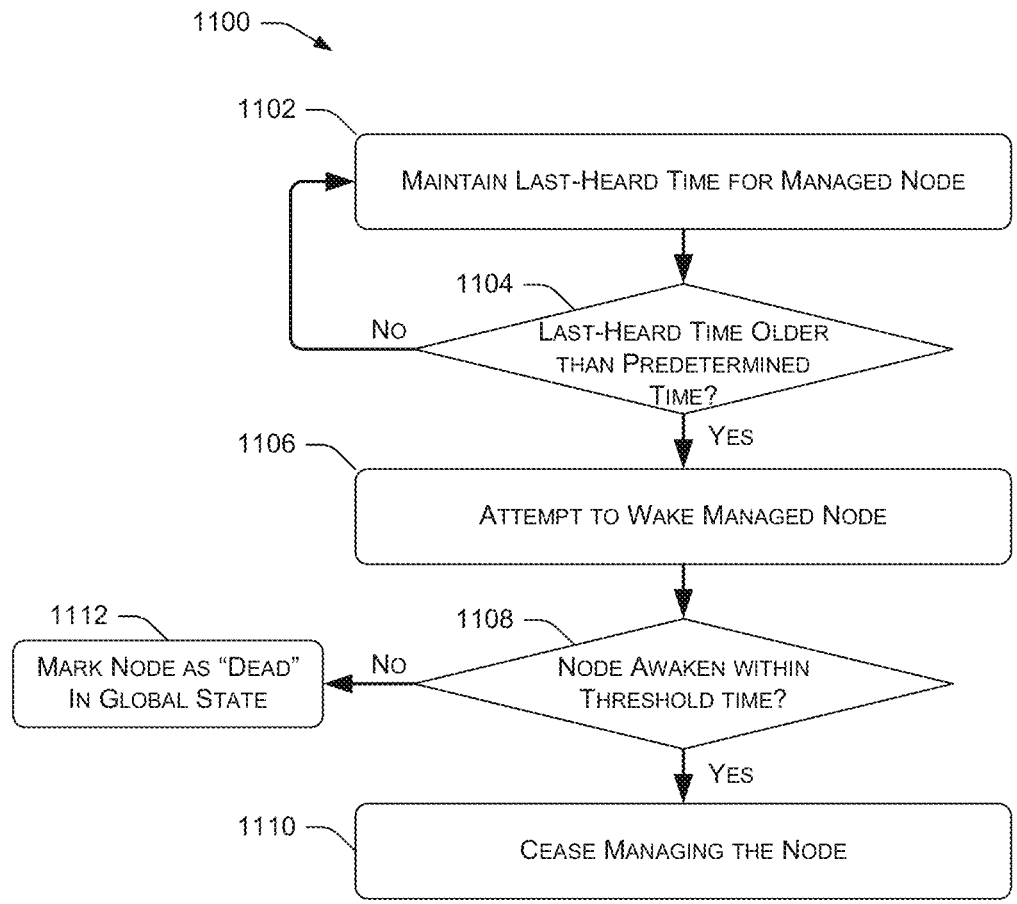

FIG. 11 illustrates yet another example process 1100 that a node may employ when managing another node within the subnet 106. When a node manages another node, the managing node may maintain in the global state 124 a time at which the managing node last heard from the managed node via a direct heartbeat, as 1102 indicates. At 1104, the managing node may determine whether this last-heard time is older than a predetermined time (e.g., one day, one week, etc.). If not, then the node continues to maintain the last-heard time. If, however, the managed node has not been heard from in the predetermined amount of time, then the managing node attempts to awaken the managed node at 1106, for the purpose of determining whether this managed node is actually dead (i.e., unable to be woken based on the node having stopped working, having become unreachable, having left the subnet, etc.).

After attempting to awaken the node at 1106, the process 1100 represents that the managing node may determine whether the managed node wakes up within a threshold time at 1108. If so, then the managed node is now awake and, hence, the managing node may cease the managing at 1110. If the node does not awaken, then the managing node may mark the managed node as dead in the management state 126 of the managing node at 1112. The managing node may continue managing the dead node until the next time the managing node falls asleep (e.g., exits the S0 power state) or until expiration of a predetermined amount of time (e.g., a day, a week, etc.), whichever comes first.

During that time, the managing node may respond to probes intended for the managed node with a probe response of "dead."

In some instances, two or more nodes will each decide to start managing the same node at once. This may be acceptable, since multiple managers do not interfere with each other in their fundamental duty to wake the managed node. However, some implementations may employ the techniques described below, which detect and resolve scenarios where multiple nodes attempt to manage a single node.

Figure 12:
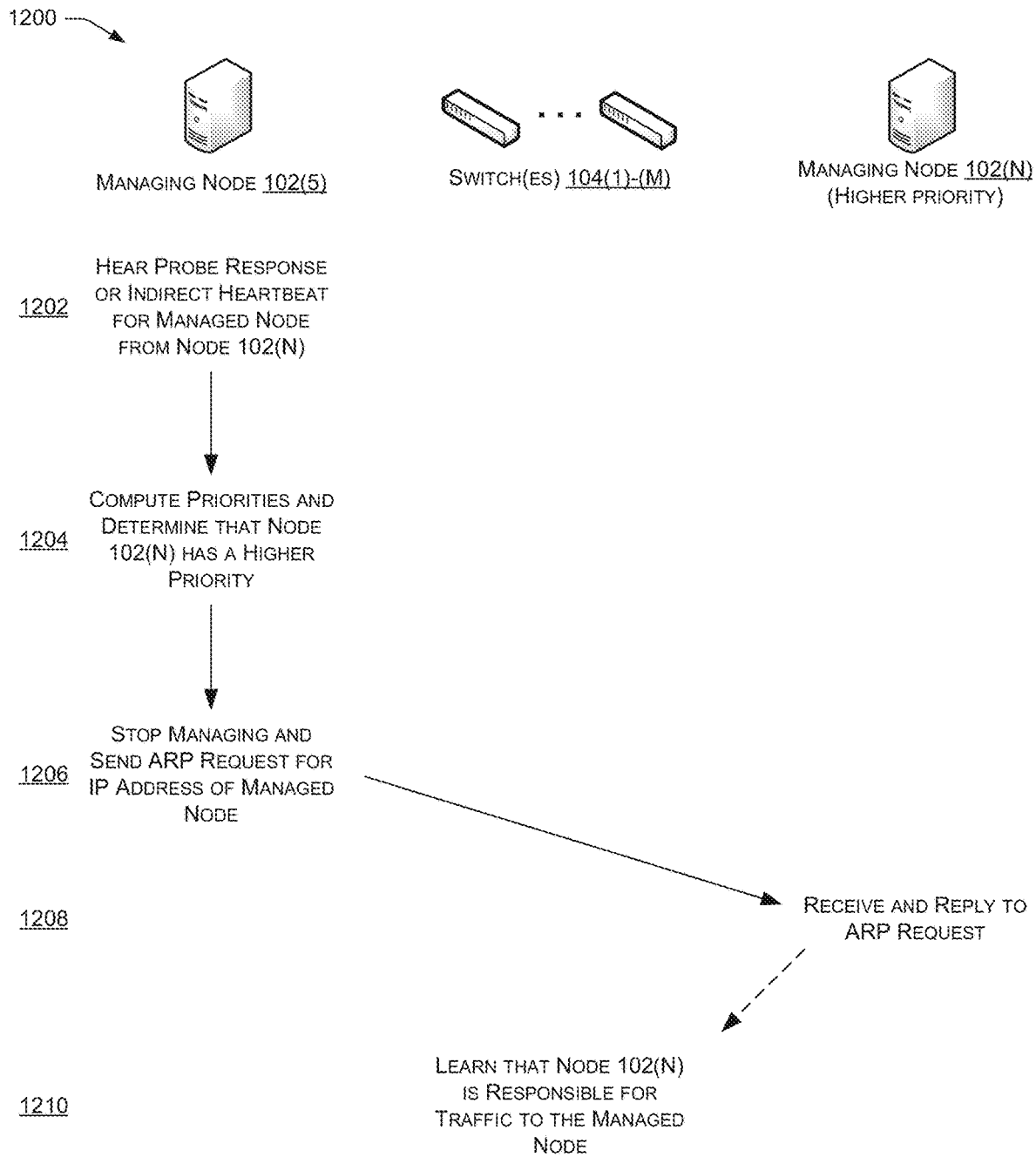
FIG. 12 is an example process for relinquishing management of a sleeping device in response to learning that another device having a higher priority is also managing the sleeping device.

FIG. 12, for instance, illustrates such a process 1200. Here, one node relinquishes management of a sleeping node in response to learning that another node having a higher priority is also managing the sleeping node. In some instances, each node of the subnet 106 may be configured to determine its priority to manage a particular node without communicating with other nodes in the subnet. For instance, the priority of a first node "A" to manage a second node "B" may be defined as the hash of the concatenation of the MAC addresses of A and B. While this represents one example way of determining priorities, the techniques may determine priority in any other way, either taking into account the identity of the managed node or without regard to the identity of the managed node.

The process 1200 includes an example node 102(5) hearing, at 1202, a probe response or indirect heartbeat for a node that it manages from another node in the subnet 106, namely example node 102(N). In response, the node 102(5) may compute, at 1204, the priority of the node 102(5) to manage the managed node and the priority of the node 102(N) to manage the managed node. In this example, the node 102(5) may determine that the node 102(N) has a greater priority to manage this particular managed node. As such, the node 102(5) may stop managing the managed node and may send an ARP request for the IP address of the managed node at 1206. At 1208, the higher-priority node 102(N) may receive and reply to this ARP request. By doing so, one or more of the switches 104(1)-(M) may learn (or re-learn) that the node 102(N) is responsible for traffic intended for the managed node at 1210. This ensures that the switches 104(1)-(M) do not route this traffic to the node 102(5) with the lower priority to manage the managed node, and who has ceased managing the node.

Figure 13:
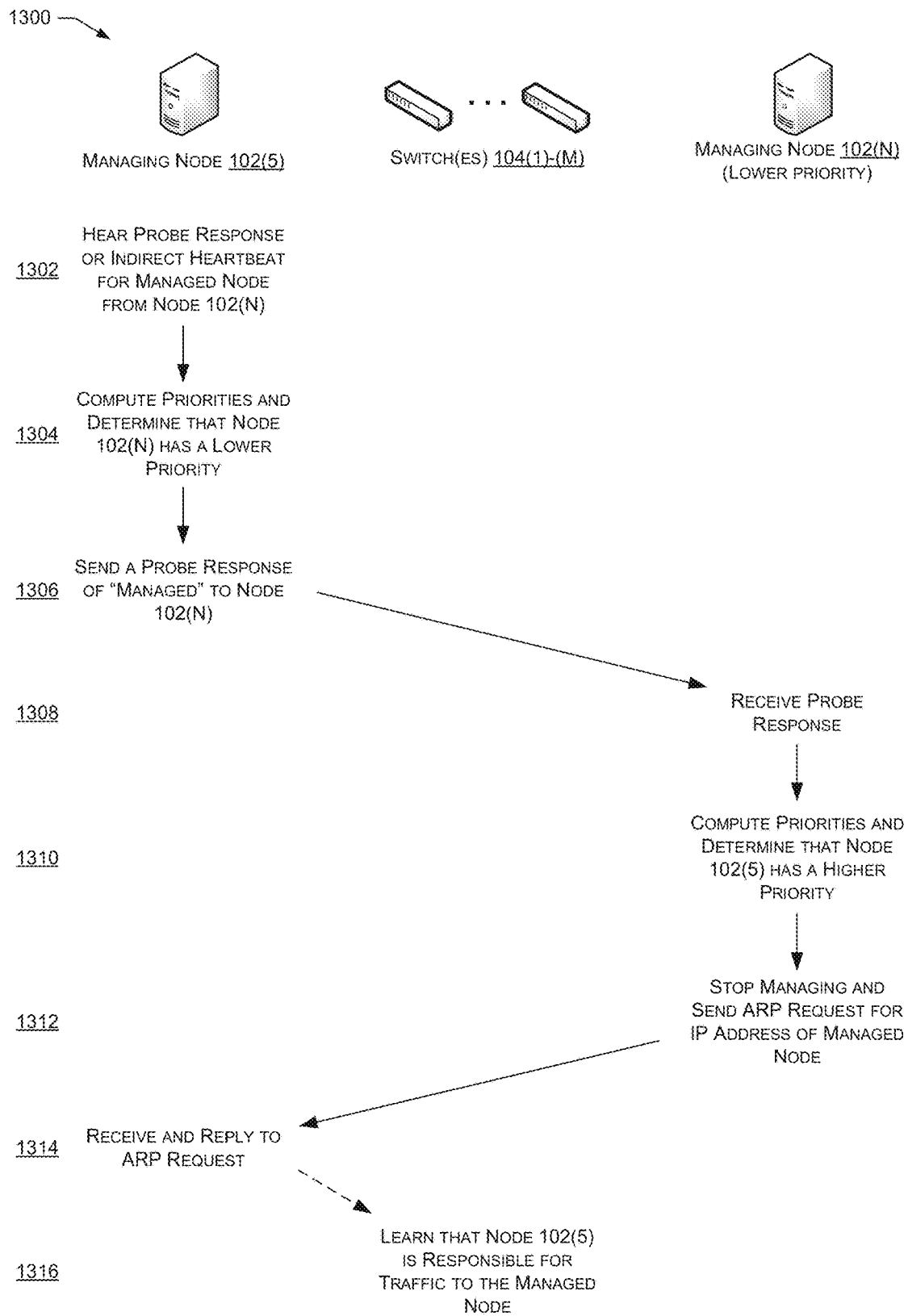
FIG. 13 is an example process for continuing management of a sleeping device in response to learning that another device having a lower priority is also managing the sleeping device.

FIG. 13, meanwhile, represents an example process 1300 for continuing management of a sleeping node in response to learning that another node having a lower priority is also managing the sleeping node. Here, at 1302 the node 102(5) again hears a probe response or indirect heartbeat for a node that it manages from another node in the subnet 106, namely example node 102(N). In response, the node 102(5) may compute, at 1304, the priority of the node 102(5) to manage the managed node and the priority of the node 102(N) to manage the managed node. In this example, the node 102(5) may determine that the node 102(5) has the greater priority. As such, the node 102(5) may send, at 1306, a probe response of "managed" to the node 102(N) for the purpose of causing the lower-priority node to implement the process 1200.

At 1308, the node 102(N) receives the probe response and, in response, computes the priorities of itself and the node 102(5) at 1310. After learning that the node 102(5) has the higher priority in this instance, the node 102(N) stops managing the managed node and sends an ARP request at 1312. At 1314, the higher-priority node 102(5) receives and replies to the ARP request. At 1316, one or more of the switches 104(1)-(M) then learn (or re-learn) that the node 102(5) is responsible for traffic intended for the managed node. This ensures that the switches 104(1)-(M) do not route this traffic to the node 102(N) with the lower priority to manage the managed node, and who has ceased managing the node.

Example Processes for Ensuring System Integrity

As used herein, "apocalypse" is the condition in which each of the nodes 102(1)-(N) on the subnet 106 that run the server process 120 are asleep, such that no node remains awake in order to wake up nodes that should be awoken. In order to avoid this, the described techniques may attempt to keep at least one node that runs the server process 120 awake at each given time. Further, the techniques may keep awake multiple nodes for the purpose of limiting the work any one node may have to do, as well as to limit the possibility of each node going to sleep at once and triggering apocalypse.

The techniques may determine the minimum number of nodes running the server process 120 to keep awake at a given time in any number of ways. In one example, the techniques describe this number by a function q(N), where N is the number of nodes on the subnet 106. One possible solution for q(N) is max{Q, N/B}. The constant part, Q, may ensure that the subnet 106 does not get into a situation where there are very few management-capable nodes that are awake and each of these nodes simultaneously decides to go to sleep. The N/B aspect, meanwhile, may ensure that a node may not have to manage too many nodes and may not have to send more than a certain amount of probes, B, at a time.

In choosing Q, assume that when the number of woken node(s) that runs the server process 120 goes below Q, it takes v time to wake another such node. Therefore, the problematic case where each of the Q nodes decides to sleep within the same v-length interval may be modeled. If the probability of a node sleeping during period v is p(v), then the probability of apocalypse starting in a particular interval may be $[p(v)]^q$.

With this in mind, in some implementations the described techniques may select a particular amount of a time where the probability of apocalypse occurring at least once in some time, T, is some fraction or percentage chance, such 0.5 or 50%. For instance, in some implementations, a reasonable value for T might be 5 years, 50 years or the like. The probability of apocalypse not happening in an interval is $1-[p(v)]^q$. So, the techniques may solve for q with the following equation:

$$q=(\ln[1-(0.5)^{\wedge}(v/T)])/(\ln[p(v)])$$

This equation presumes that p(v) may be modeled using a Poisson distribution and that the nodes in the system go to sleep independently. For instance, if a node typically sleeps at a rate, s, then the node may sleep s*v times per interval and p(v) is the probability that the Poisson distribution with mean s*v has a non-zero value. For an example where v=60 seconds, s=5 per night, and T=50 years, Q equals just under three, meaning that in some implementations three nodes may be the threshold number of nodes to keep awake at a given time. Of course, while the above discussion has provided one example way of determining a threshold number of nodes running the server process 120 to keep awake at a given time, this number may be calculated in any other way or even chosen randomly in other implementations.

Figure 14:
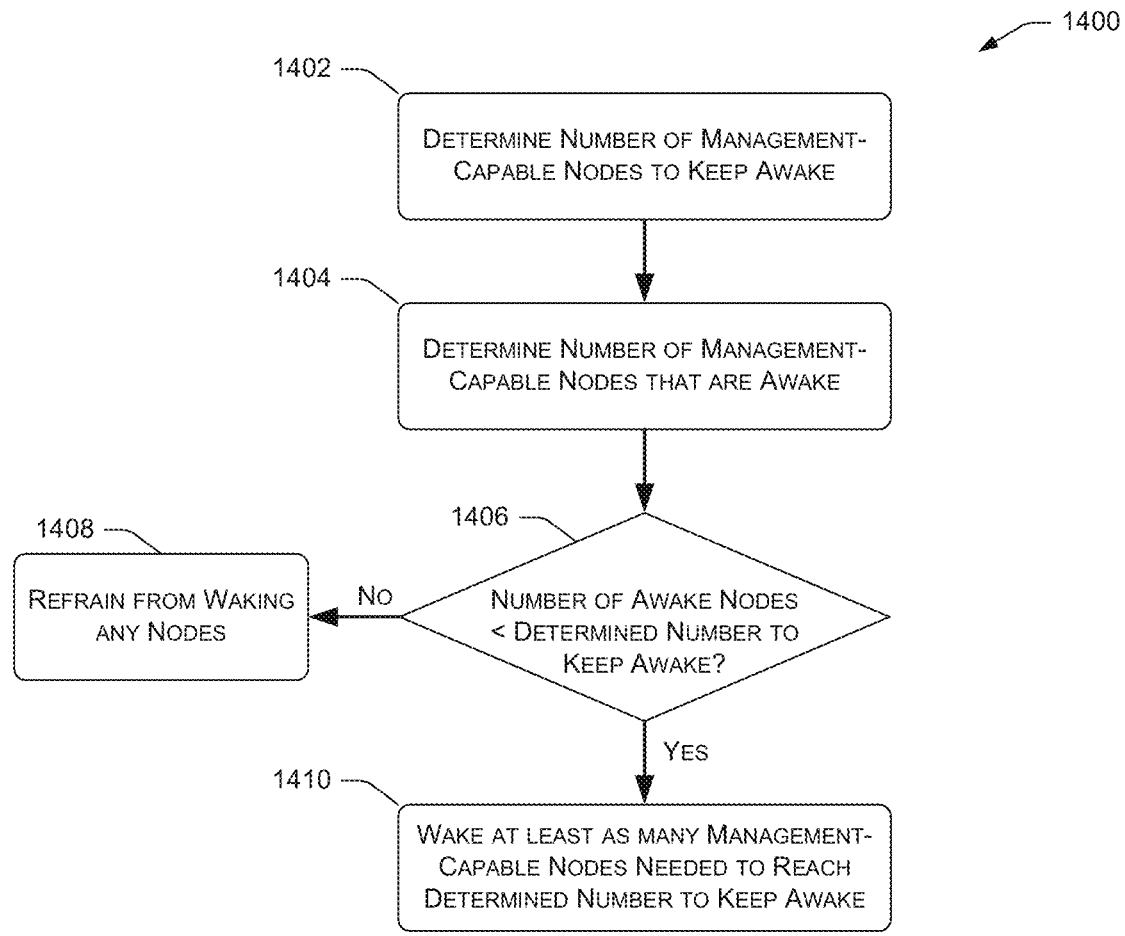
FIG. 14 is a flow diagram of an example process for ensuring that a minimum number of management-capable computing devices within the subnet remain awake.

FIG. 14 is a flow diagram of one example process 1400 for ensuring that a minimum number of management-capable nodes within the subnet 106 remain awake at a given time, after selecting the minimum number in the manner above or otherwise.

At 1402, the process 1400 represents determining a number of management-capable nodes to keep awake at the given time. In some instances, this number may comprise the minimum number discussed above. At 1404, the process represents computing the number of management-capable nodes that are currently awake. In some instances, the recruiter node may make this determination, as discussed in detail below. At 1406, the process 1400 represents querying as to whether the determined number of management-capable nodes that are awake is less than the number of management-capable nodes to keep awake. If not, then the process 1400 represents refraining from waking any nodes at 1408. If so, however, then the process 1400 represents waking at least as many as many nodes as needed to reach the determined number of nodes to keep awake at 1410. For instance, the recruiter node may wake up one or more guardian nodes as discussed below.

To ensure that the minimum number of management-capable nodes are awake at a given time as discussed immediately above, at least one node may be a "recruiter" that is responsible for bringing up the number of awaken nodes to the minimum number, when needed. To do so, each node of the subnet 106 that is not freshly-started (i.e., each node that does not have stale data) may keep track of the number, k, of currently awake and management-capable nodes by counting the number of nodes in its global state 124 for which it has non-stale data and which have the "awake" and "can manage further clients" bits both set. If a node determines that the number of awake nodes is less than the minimum number and that no awake node is a recruiter, then that node may wait for r*t seconds before becoming the recruiter, where r is the rank of its MAC address among each node that runs the server process 120 and t is a typical broadcast message delivery time. Note that the highest-priority node (r=0) may wait for zero seconds. Alternatively, the highest-priority node may wait for 0 seconds and each other node may wait for a random delay between 0 and $r_{max}$*t seconds, where $r_{max}$ is the total number of nodes running the server process 120.

If a recruiter is still needed after the delay described above, then that node becomes a recruiter. Since this is a state change, the node sends a direct heartbeat to each of the other nodes 102(1)-(N) on the subnet 106 indicating it is now a recruiter. By implementing this delay, these techniques lessen the probability that two nodes may simultaneously decide to become recruiters. The staggered delay scheme makes it likely that one node will self-select as a recruiter and notify each other node before other nodes decide to become recruiters. If the highest-priority node does not notice the need for it to become a recruiter (e.g., because it is freshly-started), then a lower-priority node may likely become the recruiter shortly. While the above techniques base recruiter priority on MAC addresses, this priority may be determined in any other way, such as with reference to a day-specific or time-specific value.

However chosen, a recruiter is tasked with waking up enough nodes so that the number of awake server nodes is at least equal to the minimum number. In particular, the recruiter selects q(n)–k sleeping and management-capable nodes (e.g., at random, via an order determined by a hash of the nodes' MAC address and the current date, etc.) and starts the following process for each:

The recruiter sends a packet to wake up the sleeping node.
The recruiter repeatedly tries to send the woken node a packet telling it to become a guardian.
When the node finally wakes up, it receives this packet and becomes a guardian. That is, it starts a process that asks its operating system to keep the node awake despite idleness. While this request is not guaranteed to work (e.g., because the user could explicitly shut down the node) it is meant to make the node more unlikely to turn off
Because the guardian's state has changed (becoming a guardian), it sends a direct heartbeat.
This heartbeat informs the recruiter that it can stop sending the packet telling the woken node to become a guardian.
The heartbeat also informs the recruiter that k has increased.

The recruiter might not wait indefinitely for the woken nodes to wake up and become guardians. After some threshold amount of time (e.g., thirty seconds, two minutes, etc.), the recruiter may start the recruitment process over. In other words, it may re-compute k and again pick q(n)–k management-capable nodes at random, and try to awaken these nodes. If at any point the recruiter determines that the minimum number of management-capable nodes is awake, then this node stops being a recruiter. Because this is a state change, the node then sends a direct heartbeat informing the subnet 106 that it is no longer a recruiter.

A guardian, meanwhile, keeps track of $k_0$, the number of actively probing nodes excluding those that are guardians. If, at any point, a guardian is not freshly started and believes that $k_0$ is at least equal to minimum number of management-capable nodes, q(n), then the node ceases to be a guardian. To cease to be a guardian, a node may end the process that asked the operating system to remain awake. Ceasing to be a guardian is also a state change, and may therefore also trigger the node to send a direct heartbeat. In some instances, a node cannot be a recruiter or guardian when not awake. As such, when a node awakens (e.g., enters the S0 power state), the node may determine if it holds either of these roles. If so, the node may cease to engage in these roles and, hence, informs the subnet 106 about this change.

If a recruiter sees another recruiter, meanwhile, the techniques may enable one recruiter to take priority and another to cease acting in that role. For instance, the techniques may employ a hash priority scheme that includes a current date in the computation of the hash priority, such that some nodes are not consistently biased toward being recruiters.

In some implementations, the techniques may also employ a watch system, meaning that nodes of the subnet 106 may keep a rotating watch for apocalypse. Enabling this watch is the fact that some nodes have wake-on-timer ability, which allows them to set a timer to wake up at a certain future time. At that time, the node will wake up and stay up for a time period of length w, which may be based on the number of management-capable nodes that employ a watch timer. In general, the techniques may minimize the amount of time w for power-saving purposes. During time w, the woken node will check for apocalypse. A node may be able to detect apocalypse rather quickly, from the evidence that no other node probes the awake node over the course of several seconds. In the event that the woken node detects apocalypse (e.g., due to a power outage), this node may wake up q(n) management-capable nodes.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computing device comprising:
   one or more processors; and
   memory storing executable instructions that, when executed by the one or more processors, cause the one or more processors to perform acts comprising:
      determining a number of a plurality of management-capable computing devices that are awake at a given time in a subnet, wherein the plurality of management-capable computing devices comprise computing devices that are capable of managing one or more other computing devices that are asleep, wherein the subnet comprises computing devices including both the plurality of management-capable computing devices and the one or more other computing devices;
      determining that the number of the plurality of management-capable computing devices is below a threshold, wherein at least two management-capable computing devices of the plurality of management-capable computing devices manage computing devices in the subnet;
      waking at least one or more management-capable computing devices of the plurality of management-capable computing devices that are asleep in the subnet in response to the determined number being less than the threshold to increase the number of management-capable computing devices that are awake to be equal to or greater than the threshold; and
      managing the one or more other computing devices that are asleep, wherein the managing involves:
         informing the computing devices that are awake and reside within the subnet that the one or more other computing devices that are asleep are being managed;
         probing the one or more other computing devices that are asleep to determine whether the one or more other computing devices is asleep and is managed by at least one or more management-capable computing devices of the plurality of management-capable computing devices;

pinging the one or more other computing devices that are asleep to determine whether the one or more other computing devices is asleep and is managed by at least one or more management-capable computing devices of the plurality of management-capable computing devices when the one or more computing devices that are asleep do not respond to the probing of the one or more other computing devices; and monitoring requests for services hosted by the one or more other computing devices that are asleep.

2. The computing device of claim 1, wherein the threshold comprises a minimum number of management-capable computing devices to keep awake at the given time in the subnet.

3. The computing device of claim 1, wherein determining the number of management-capable computing devices that are awake at the given time in the subnet comprises counting the number of management-capable computing devices that are awake at the given time in the subnet through a global state of the subnet.

4. The computing device of claim 1, the acts further comprising:

subsequent to determining that the number of management-capable computing devices that are awake at the given time is below the threshold, determining that no recruiter exists in the subnet, the recruiter being a computing device responsible for bringing up a total number of management-capable computing devices that are awake to the threshold;

waiting for a predetermined time, the predetermined time being based at least in part on a rank and a broadcast message delivery time; and becoming the recruiter in response to determining that no recruiter exists in the subnet after the predetermined time.

5. The computing device of claim 4, the acts further comprising sending a message to computing devices in the subnet to indicate that the computing device is the recruiter.

6. The computing device of claim 4, the acts further comprising:

stopping as the recruiter after determining that a minimum number of management-capable computing devices are awake; and sending a message to a plurality of other computing devices in the subnet to indicate that the computing device is no longer the recruiter.

7. The computing device of claim 1, the acts further comprising:

selecting one or more other management-capable computing devices that are asleep in the subnet after a threshold amount of time is passed and a minimum number of management-capable computing devices that are awake is not reached; and awaking the one or more other management-capable computing devices.

8. A method implemented at least in part by a computing device, the method comprising:

determining a number of a plurality of management-capable computing devices that are awake at a given time in a subnet, wherein the plurality of management-capable computing devices comprise computing devices that are capable of managing one or more other computing devices that are asleep, wherein the subnet comprises computing devices including both the plurality of management-capable computing devices and the one or more other computing devices;

determining a number of a plurality of management-capable computing devices that are awake at a given time in a subnet, wherein the plurality of management-capable computing devices comprise computing devices that are capable of managing one or more other computing devices that are asleep, wherein the subnet comprises computing devices including both the plurality of management-capable computing devices and the one or more other computing devices;

waking at least one or more management-capable computing devices of the plurality of management-capable computing devices that are asleep in the subnet in response to the determined number being less than the threshold to increase the number of management-capable computing devices that are awake to be equal to or greater than the threshold; and managing the one or more other computing devices that are asleep, wherein the managing involves:

informing the computing devices that are awake and reside within the subnet that the one or more other computing devices that are asleep are being managed;

probing the one or more other computing devices that are asleep to determine whether the one or more other computing devices is asleep and is managed by at least one or more management-capable computing devices of the plurality of management-capable computing devices;

pinging the one or more other computing devices that are asleep to determine whether the one or more other computing devices is asleep and is managed by at least one or more management-capable computing devices of the plurality of management-capable computing devices when the one or more computing devices that are asleep do not respond to the probing of the one or more other computing devices; and monitoring requests for services hosted by the one or more other computing devices that are asleep.

9. The method of claim 8, wherein the threshold comprises a minimum number of management-capable computing devices to keep awake at the given time in the subnet.

10. The method of claim 8, wherein determining the number of management-capable computing devices that are awake at the given time in the subnet comprises counting the number of management-capable computing devices that are awake at the given time in the subnet through a global state of the subnet.

11. The method of claim 8, further comprising:

subsequent to determining that the number of management-capable computing devices that are awake at the given time is below the threshold, determining that no recruiter exists in the subnet, the recruiter being a computing device responsible for bringing up a total number of management-capable computing devices that are awake to the threshold;

waiting for a predetermined time, the predetermined time being based at least in part on a rank and a broadcast message delivery time; and becoming the recruiter in response to determining that no recruiter exists in the subnet after the predetermined time.

12. The method of claim 11, further comprising sending a message to computing devices in the subnet to indicate that the computing device is the recruiter.

13. The method of claim 11, further comprising:
stopping as the recruiter after determining that a minimum number of management-capable computing devices are awake; and
sending a message to a plurality of other computing devices in the subnet to indicate that the computing device is no longer the recruiter.

14. The method of claim 8, further comprising:
selecting one or more other management-capable computing devices that are asleep in the subnet after a threshold amount of time is passed and a minimum number of management-capable computing devices that are awake is not reached; and
awaking the one or more other management-capable computing devices.

15. One or more non-transitory computer-readable media storing executable instructions that, when executed by a computing device, cause the computing device to perform acts comprising:
determining a number of a plurality of management-capable computing devices that are awake at a given time in a subnet, wherein the plurality of management-capable computing devices comprise computing devices that are capable of managing one or more other computing devices that are asleep, wherein the subnet comprises computing devices including both the plurality of management-capable computing devices and the one or more other computing devices;
determining a number of a plurality of management-capable computing devices that are awake at a given time in a subnet, wherein the plurality of management-capable computing devices comprise computing devices that are capable of managing one or more other computing devices that are asleep, wherein the subnet comprises computing devices including both the plurality of management-capable computing devices and the one or more other computing devices;
waking at least one or more management-capable computing devices of the plurality of management-capable computing devices that are asleep in the subnet in response to the determined number being less than the threshold to increase the number of management-capable computing devices that are awake to be equal to or greater than the threshold; and
managing the one or more other computing devices that are asleep, wherein the managing involves:
informing the computing devices that are awake and reside within the subnet that the one or more other computing devices that are asleep are being managed;
probing the one or more other computing devices that are asleep to determine whether the one or more other computing devices is asleep and is managed by at least one or more management-capable computing devices of the plurality of management-capable computing devices;
pinging the one or more other computing devices that are asleep to determine whether the one or more other computing devices is asleep and is managed by at least one or more management-capable computing devices of the plurality of management-capable computing devices when the one or more computing devices that are asleep do not respond to the probing of the one or more other computing devices; and
monitoring requests for services hosted by the one or more other computing devices that are asleep.

16. The one or more non-transitory computer-readable media of claim 15, wherein determining the number of management-capable computing devices that are awake at the given time in the subnet comprises counting the number of management-capable computing devices that are awake at the given time in the subnet through a global state of the subnet.

17. The one or more non-transitory computer-readable media of claim 15, the acts further comprising:
subsequent to determining that the number of management-capable computing devices that are awake at the given time is below the threshold, determining that no recruiter exists in the subnet, the recruiter being a computing device responsible for bringing up a total number of management-capable computing devices that are awake to the threshold;
waiting for a predetermined time, the predetermined time being based at least in part on a rank and a broadcast message delivery time; and
becoming the recruiter in response to determining that no recruiter exists in the subnet after the predetermined time.

18. The one or more non-transitory computer-readable media of claim 17, the acts further comprising sending a message to computing devices in the subnet to indicate that the computing device is the recruiter.

19. The one or more non-transitory computer-readable media of claim 18, the acts further comprising:
stopping as the recruiter after determining that a minimum number of management-capable computing devices are awake; and
sending a message to a plurality of other computing devices in the subnet to indicate that the computing device is no longer the recruiter.

20. The one or more non-transitory computer-readable media of claim 15, the acts further comprising:
selecting one or more other management-capable computing devices that are asleep in the subnet after a threshold amount of time is passed and a minimum number of management-capable computing devices that are awake is not reached; and
awaking the one or more other management-capable computing devices.

\* \* \* \* \*